United States Patent
Smith et al.

(10) Patent No.: US 7,675,504 B1
(45) Date of Patent: Mar. 9, 2010

(54) PERSONAL INTERFACES FOR INDEPENDENT LIVING AND HEALTH

(76) Inventors: Peter H. Smith, 1935 Orchardview Dr., Ann Arbor, MI (US) 48108; Timothy R. Pryor, 910 Monmouth Road, Windsor, Ontario N8Y 3L7 (CA)

( * ) Notice: Subject to any disclaimer, the term of this patent is extended or adjusted under 35 U.S.C. 154(b) by 943 days.

(21) Appl. No.: 11/371,224

(22) Filed: Mar. 9, 2006

Related U.S. Application Data

(63) Continuation-in-part of application No. 09/974,250, filed on Oct. 10, 2001, now abandoned, and a continuation-in-part of application No. 10/893,534, filed on Jul. 19, 2004, now Pat. No. 7,401,783, and a continuation-in-part of application No. 10/622,812, filed on Jul. 21, 2003, now Pat. No. 7,042,440.

(60) Provisional application No. 60/660,328, filed on Mar. 11, 2005, provisional application No. 60/684,959, filed on May 27, 2005.

(51) Int. Cl.
*G09G 5/00* (2006.01)
(52) U.S. Cl. .................. 345/156; 345/158; 358/1.12; 382/176
(58) Field of Classification Search ............ 345/156, 345/173, 158; 382/176; 358/1.12, 1.18, 358/2.1, 464, 527
See application file for complete search history.

(56) References Cited

U.S. PATENT DOCUMENTS

| | | | | |
|---|---|---|---|---|
| 4,899,921 A * | 2/1990 | Bendat et al. | ............... | 228/105 |
| 5,088,928 A | 2/1992 | Chan | | |
| 5,377,019 A * | 12/1994 | Okisu et al. | ................ | 358/464 |
| 5,511,148 A * | 4/1996 | Wellner | ...................... | 358/1.6 |
| 6,813,047 B1 * | 11/2004 | Murbach | ................ | 358/527 |
| 7,110,143 B2 * | 9/2006 | Bares et al. | .................. | 358/2.1 |
| 7,239,747 B2 * | 7/2007 | Bresler et al. | ............... | 382/176 |
| 2003/0100363 A1 | 5/2003 | Ali | | |

* cited by examiner

*Primary Examiner*—Richard Hjerpe
*Assistant Examiner*—Kimnhung Nguyen
(74) *Attorney, Agent, or Firm*—Stites & Harbison PLLC; Ross F. Hunt, Jr.; Douglas E. Jackson

(57) ABSTRACT

The invention herein primarily concerns computer interfaces, particularly those that may be used by senior citizens or others who are not familiar and even adverse to computers as they are utilized today. Applications of use to such persons are also disclosed, particularly in the areas of most concern to large segments of the population such as Health Maintenance and Medical, Home Control, and Communication (email and telephony). It is primarily based on TV cameras interfaced to computers via common interfaces such as USB2, Firewire, or WiFi, which are used to sense common, and familiar paper pages and books of pages.

12 Claims, 32 Drawing Sheets

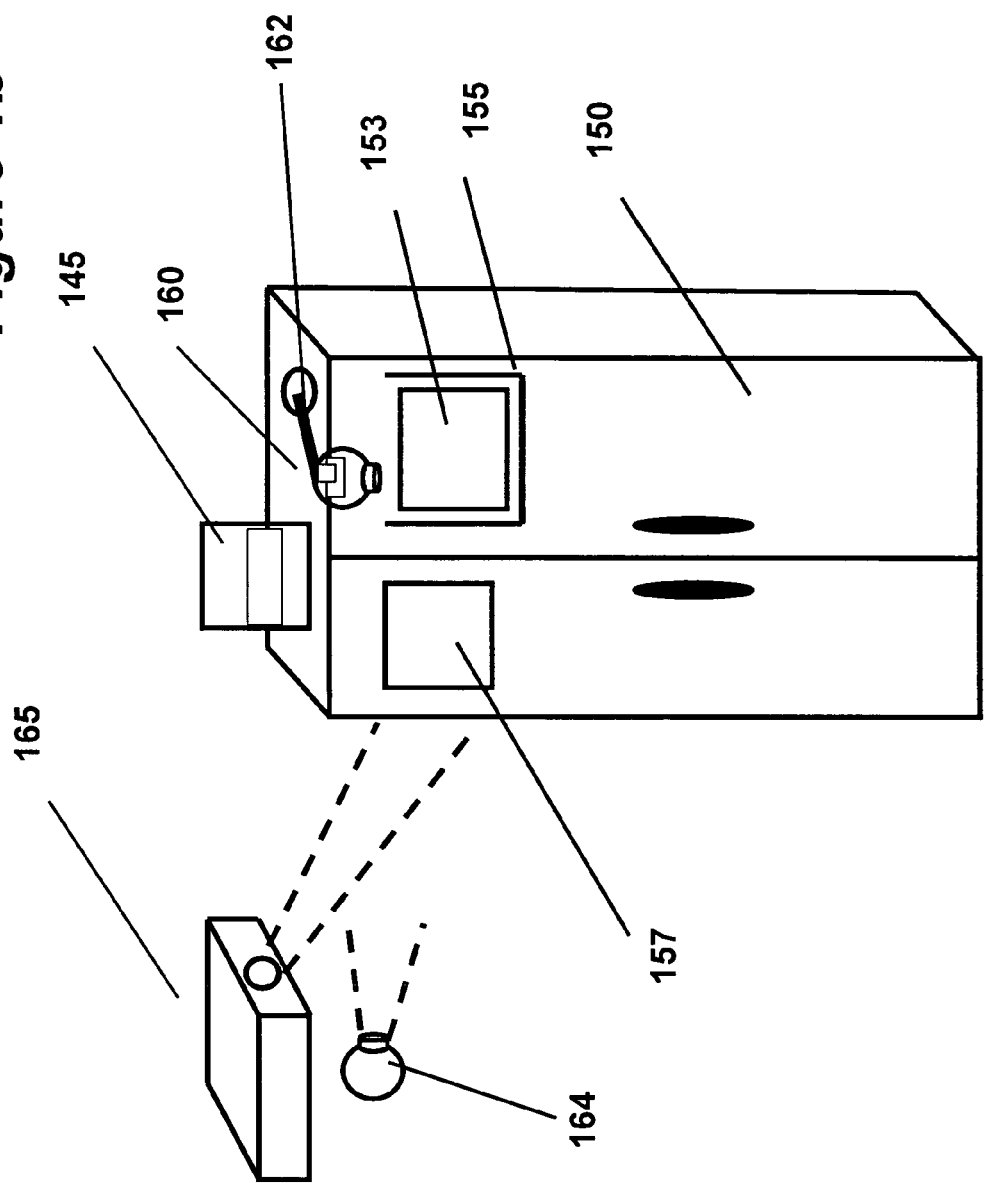

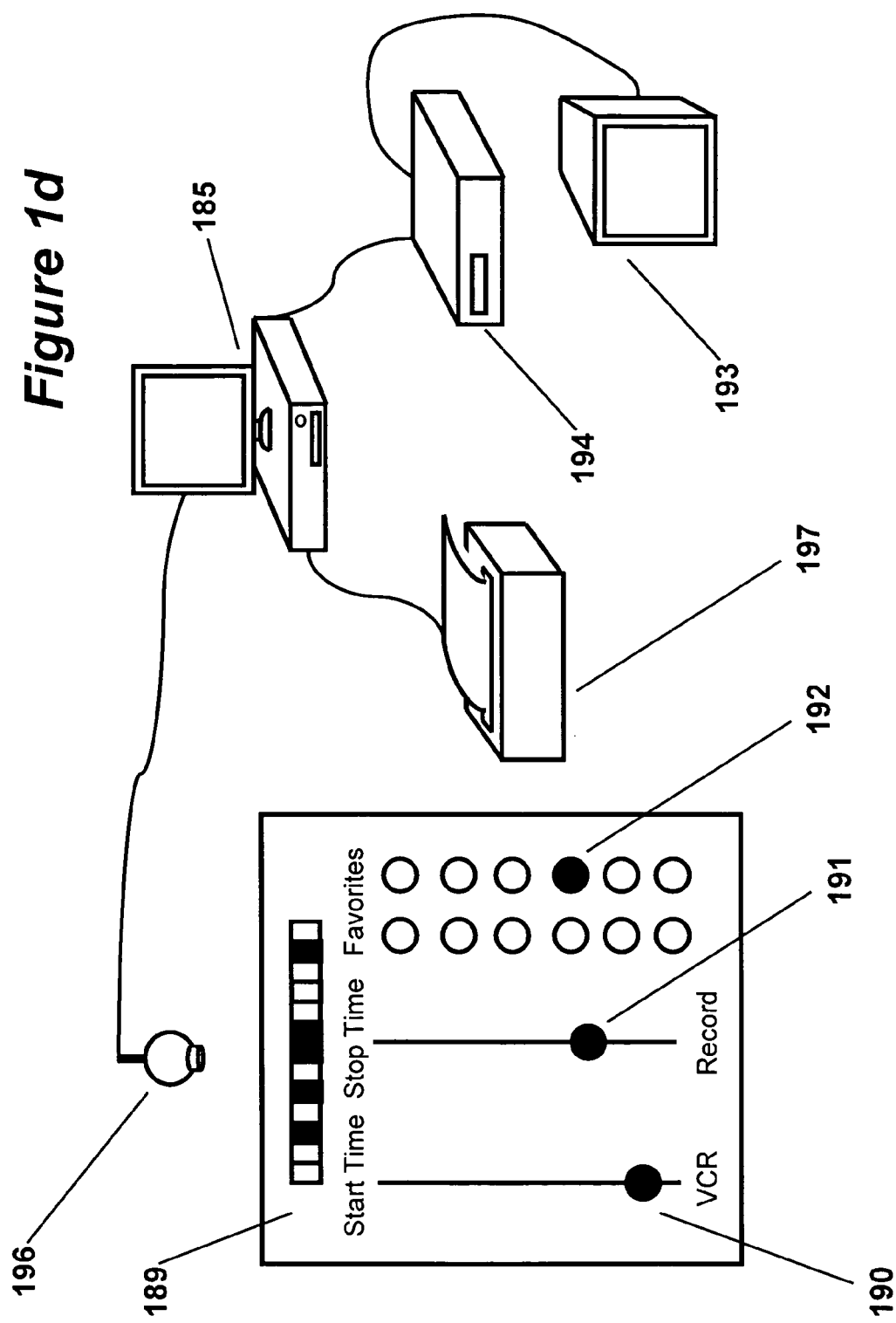

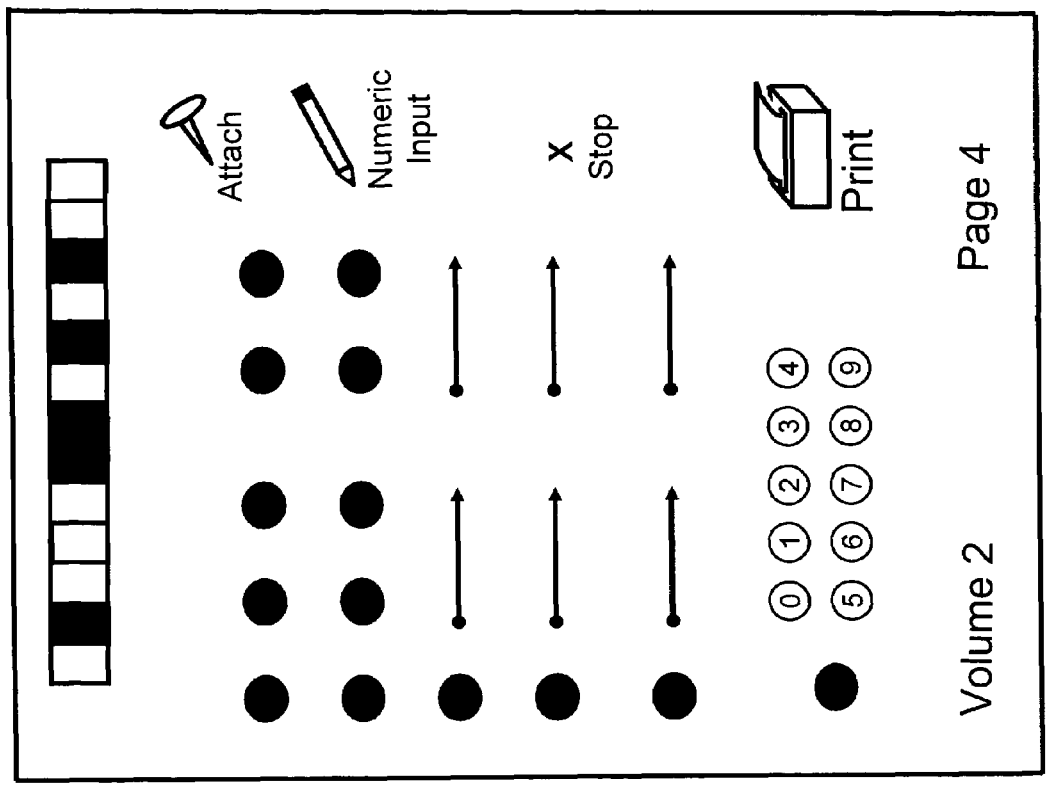

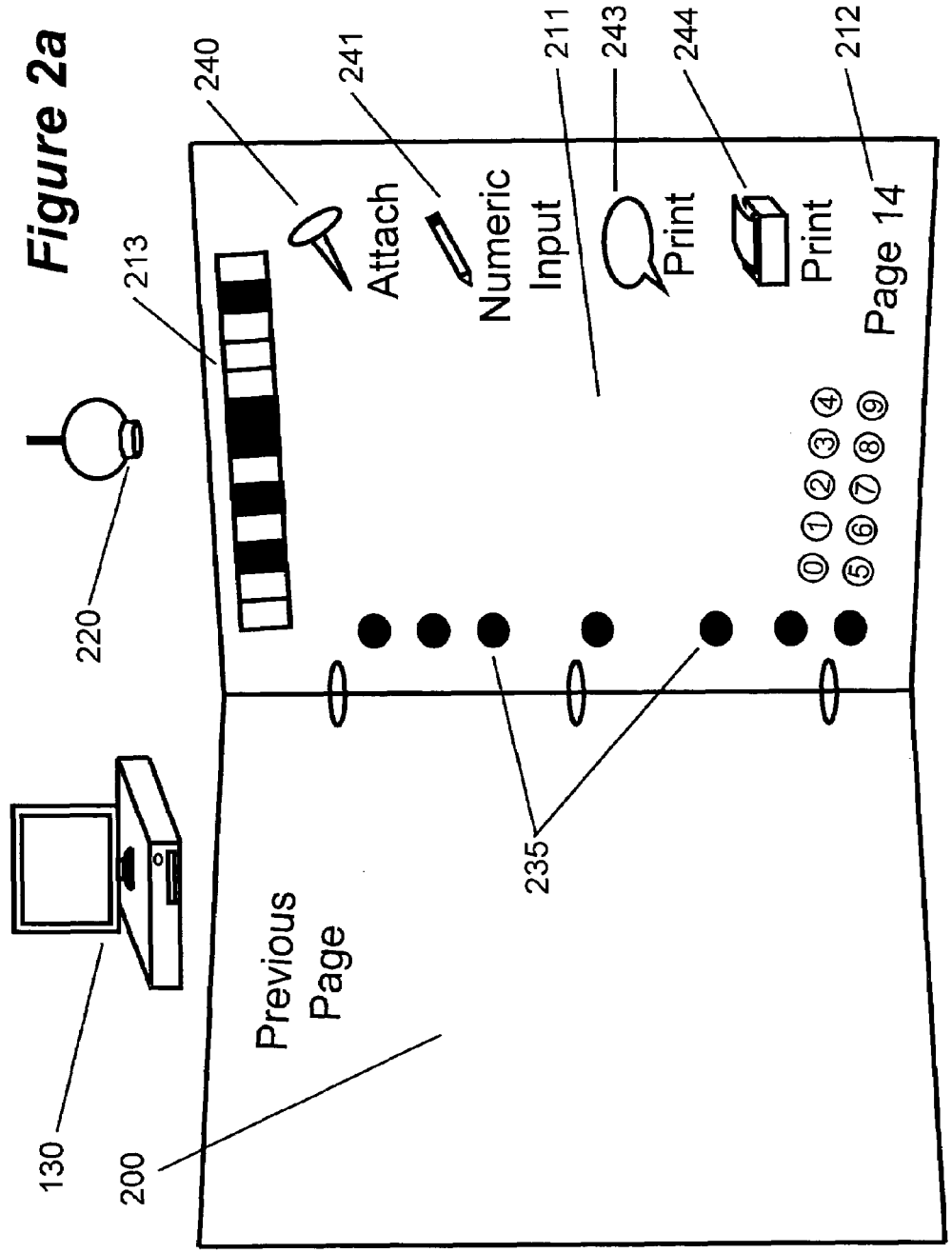

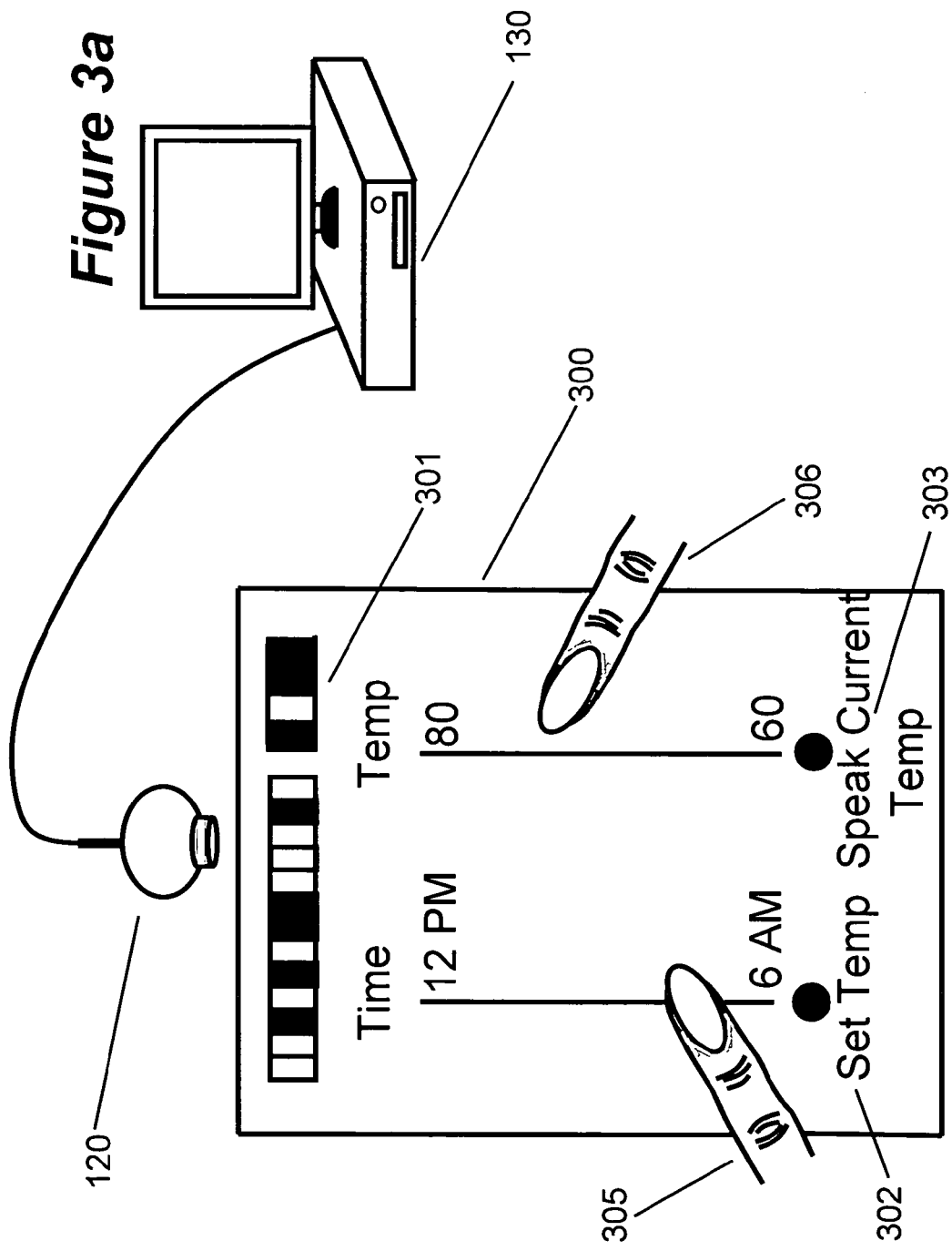

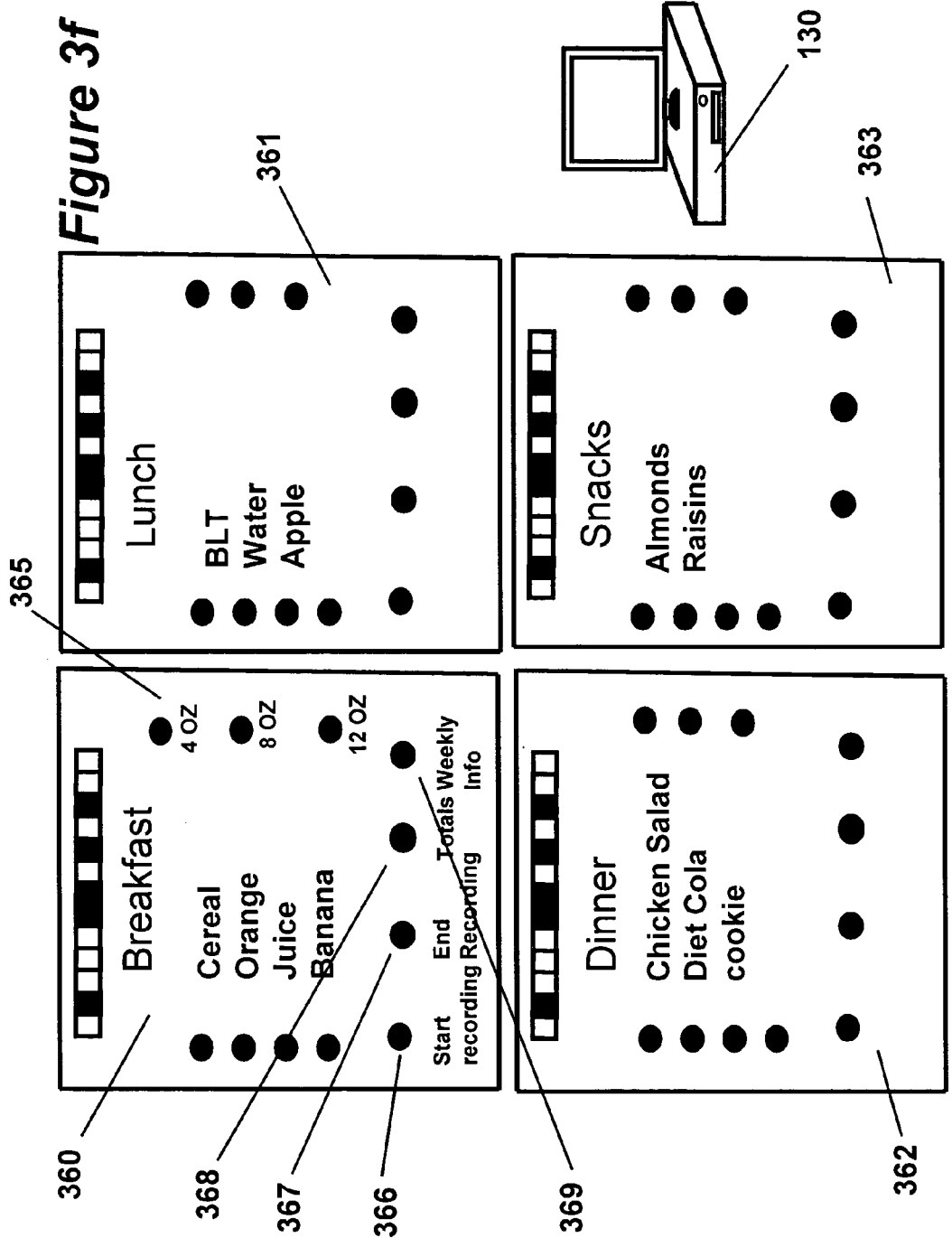

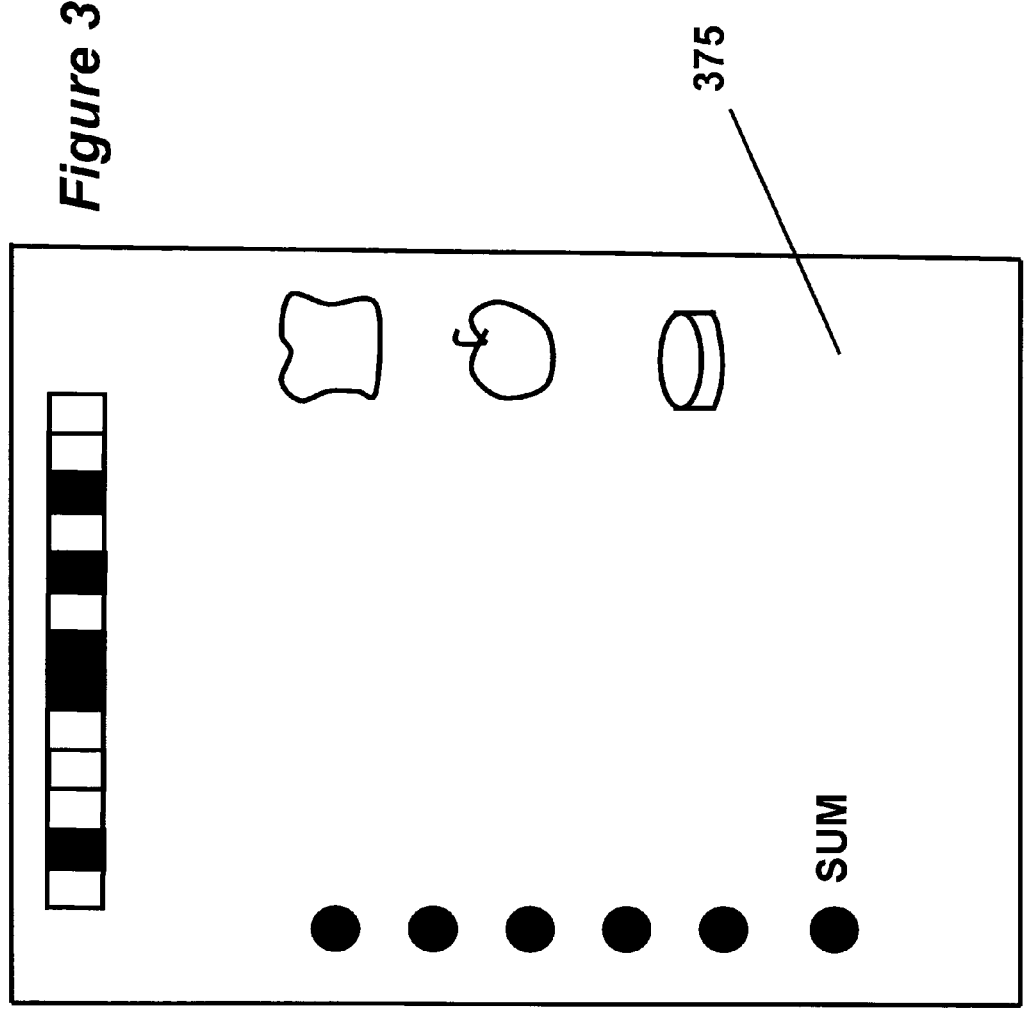

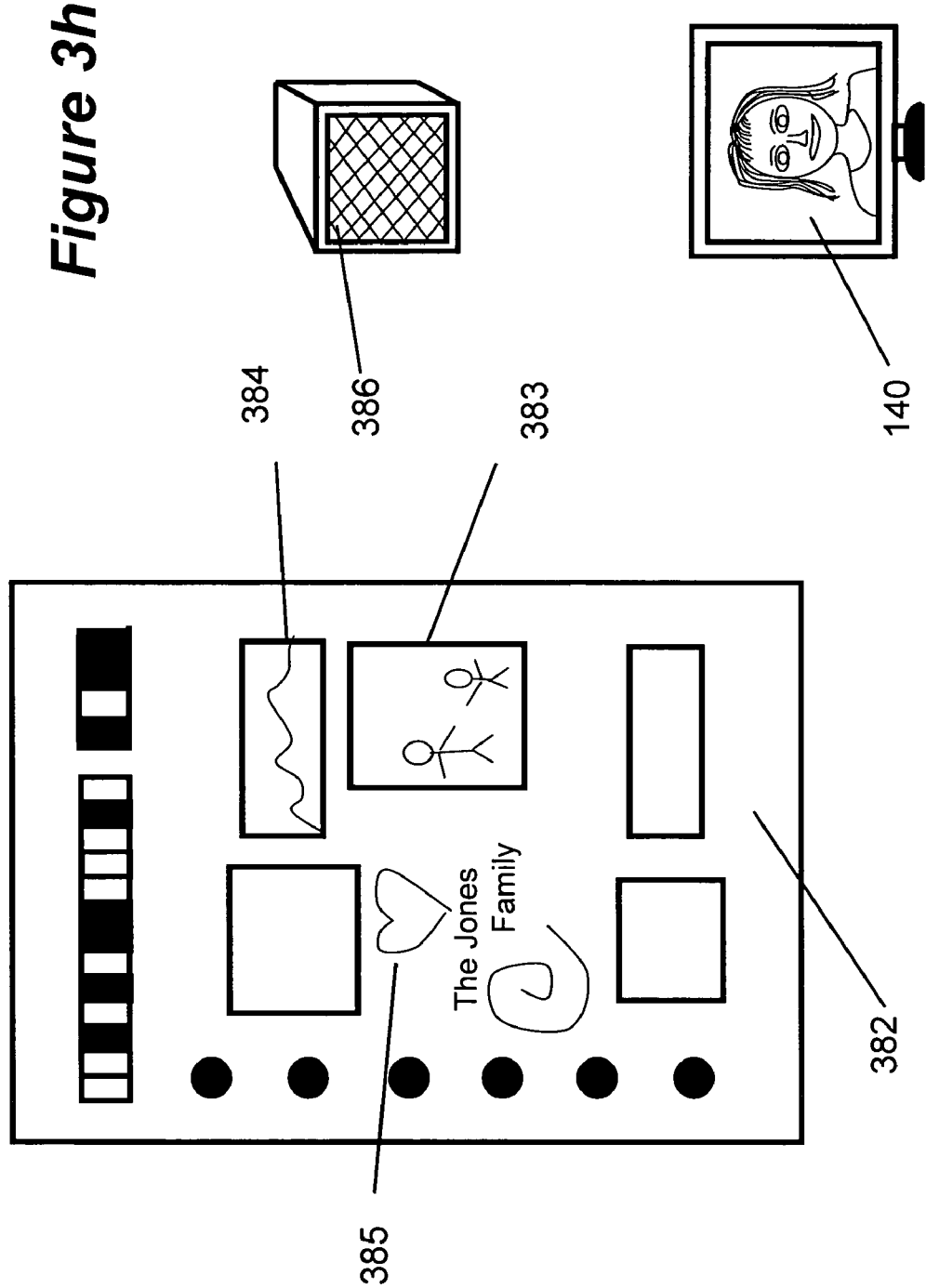

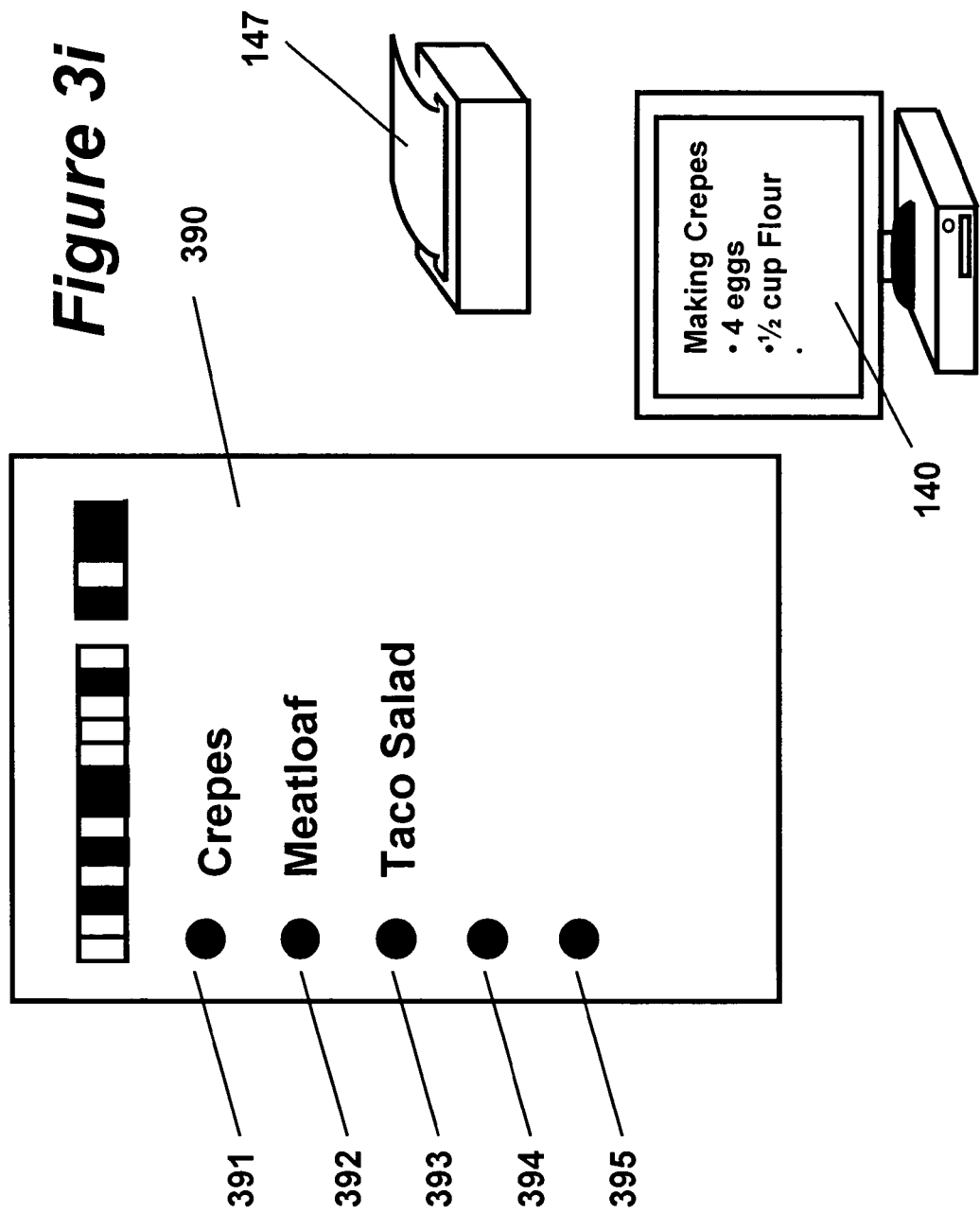

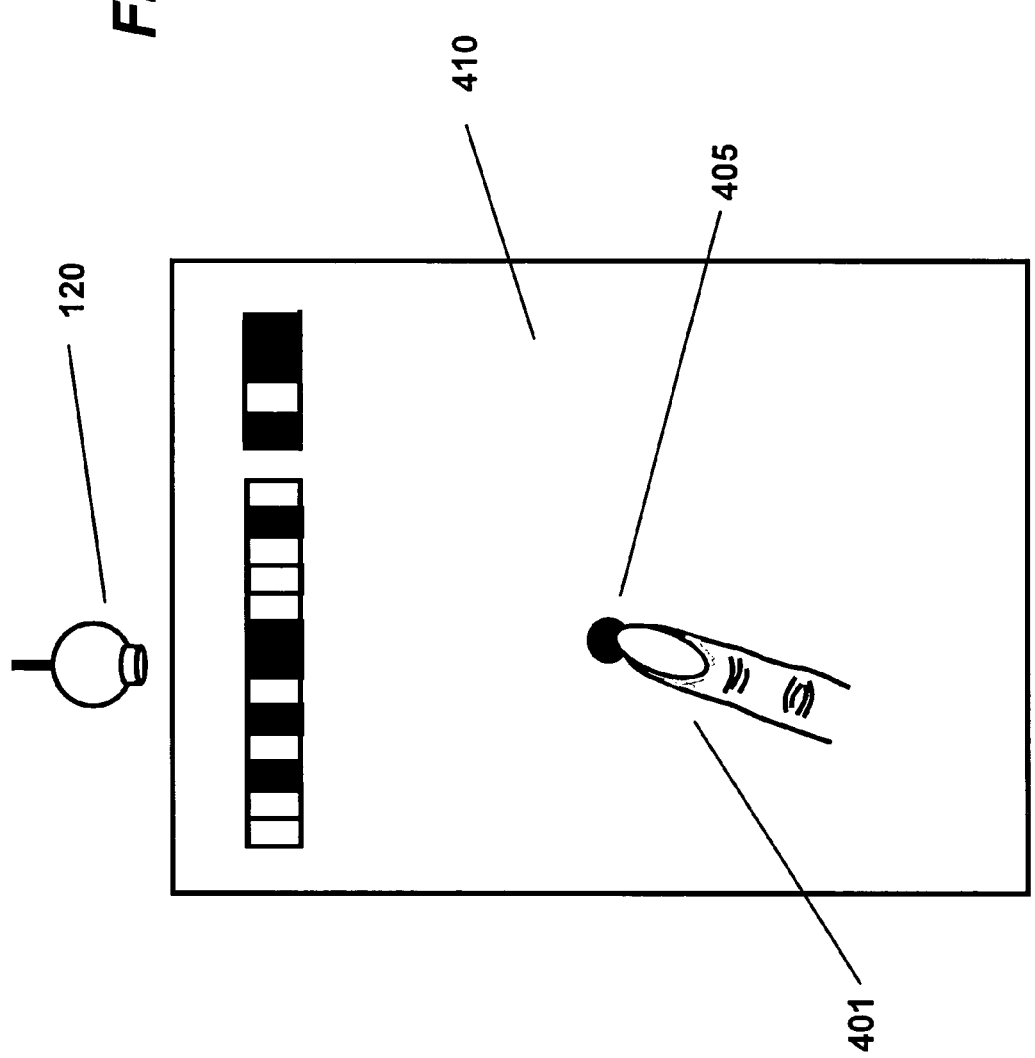

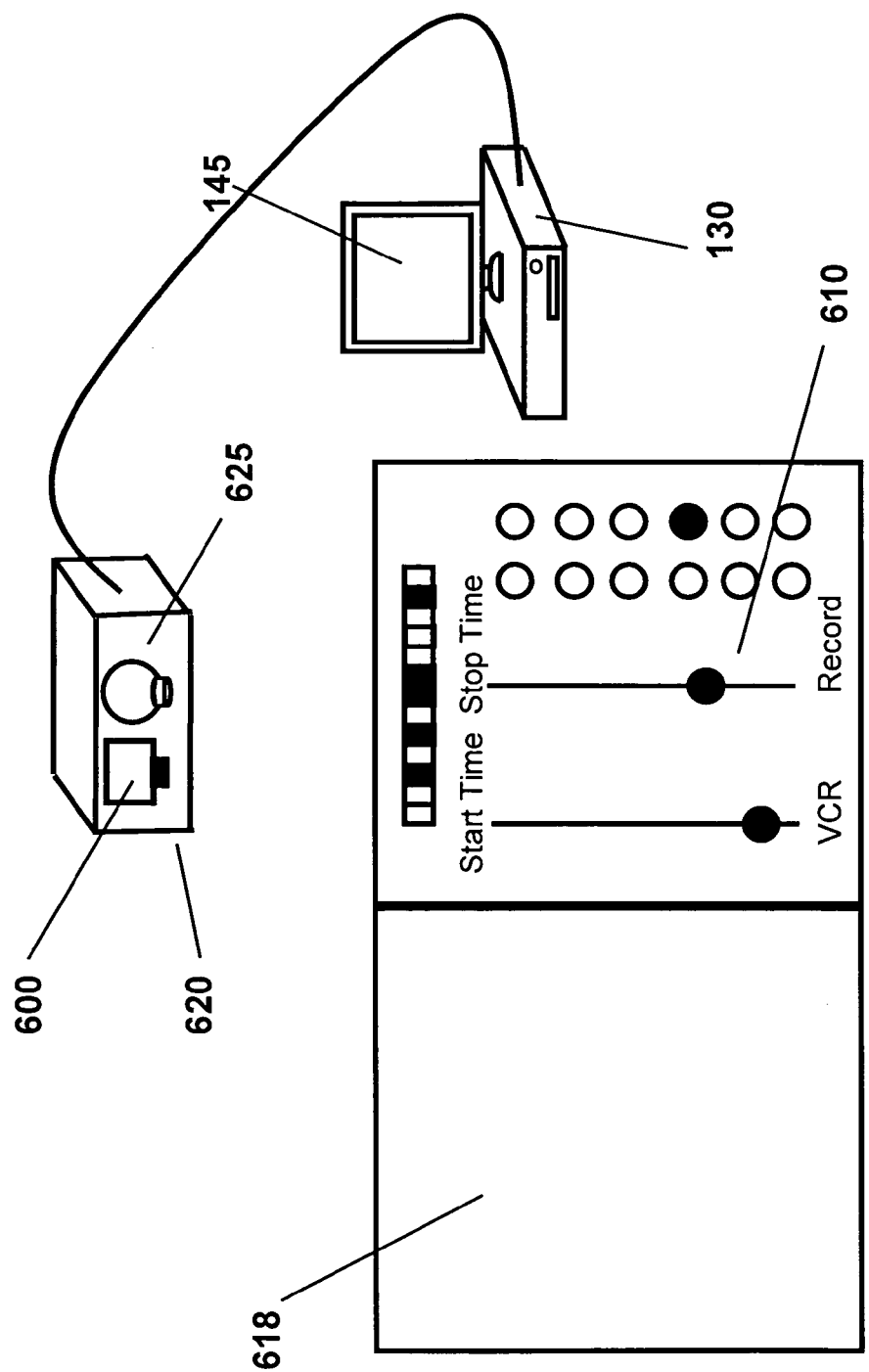

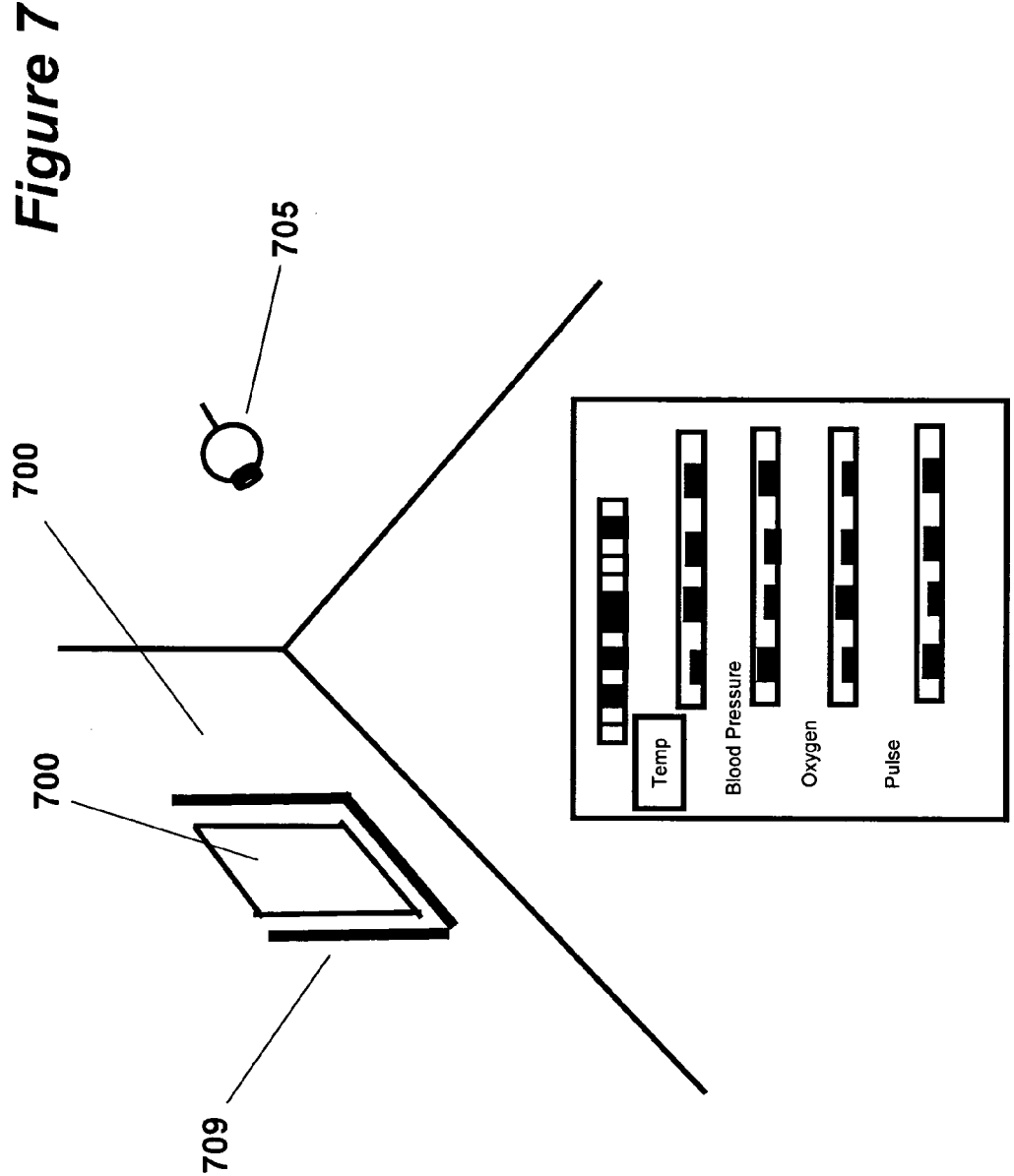

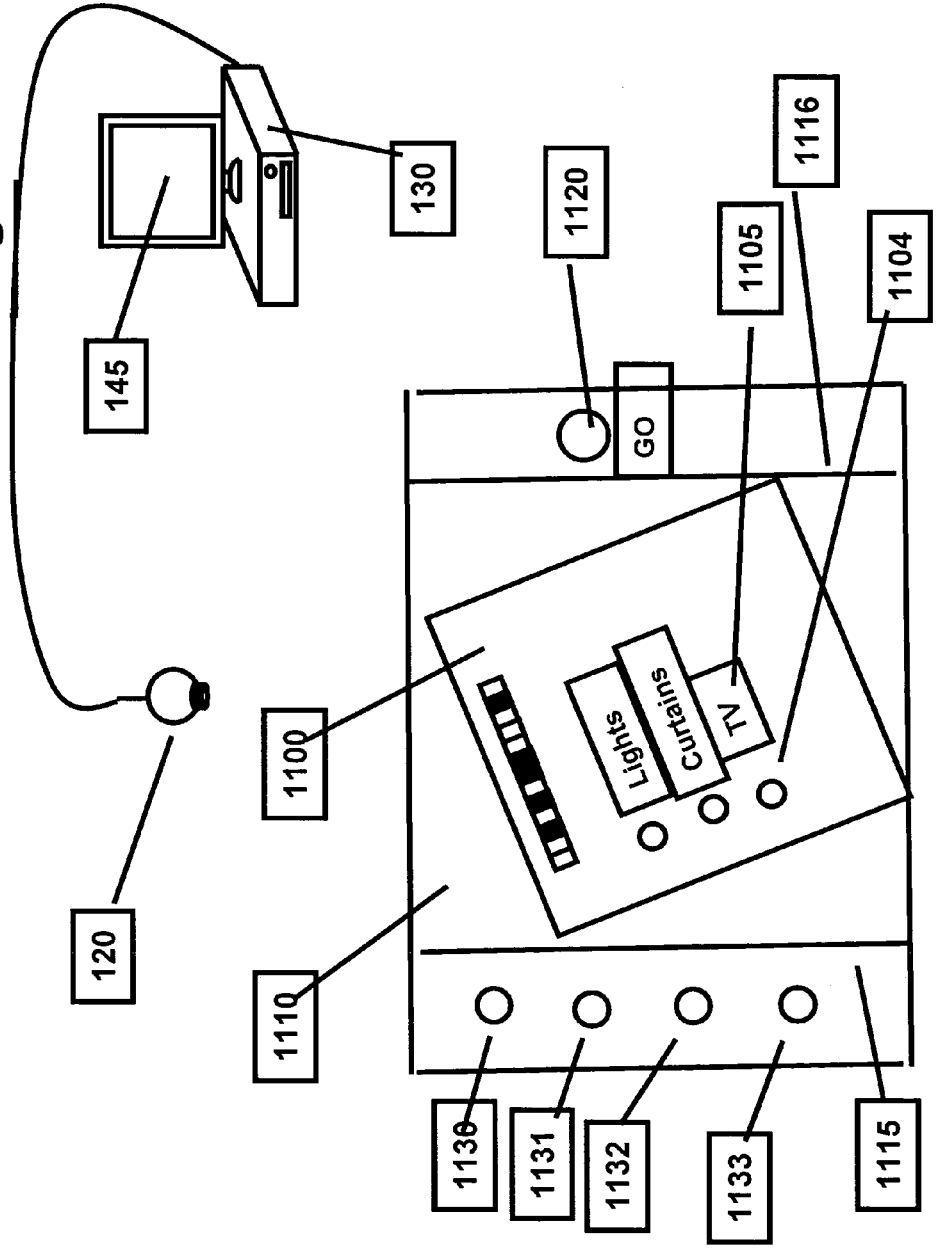

PERSONAL INTERFACES FOR INDEPENDENT LIVING AND HEALTH

CROSS REFERENCE TO RELATED APPLICATIONS

This application is a continuation in part of Ser. No. 09/974,250, filed on Oct. 10, 2001 now abandoned, entitled CODED OPTICAL PROGRAM GENERATION AND INTERACTION.

This application is also a continuation in part of U.S. Ser. No. 10/893,534 filed on Jul. 19, 2004 now U.S. Pat. No. 7,401,783, entitled CAMERA BASED MAN MACHINE INTERFACES.

This application is also a continuation in part of U.S. Ser. No. 10/622,812 filed on Jul. 21, 2003 now U.S. Pat. No. 7,042,440, entitled NOVEL MAN MACHINE INTERFACES AND APPLICATIONS.

This application claims benefit of US provisional applications; 60/660,328 filed Mar. 11, 2005, entitled PERSONAL INTERFACES FOR INDEPENDENT LIVING and 60/684,959, filed May 27, 2005, entitled COMPUTER BASED AIDS FOR INDEPENDENT LIVING AND HEALTH.

FIELD OF THE INVENTION

The invention herein primarily concerns computer interfaces, particularly those that may be used by those persons who are not familiar and even adverse to computers as they are utilized today. Applications of use to such persons are also disclosed, particularly in the areas of most concern to large segments of the population such as Health Maintenance, Home Control, and Communication (email and telephony). The invention allows advances in computing to reach everyone. It is primarily based on common and familiar "notebooks" (particularly but not necessarily loose-leaf), and TV cameras interfaced to computers via common interfaces such as USB2, Firewire, or WiFi.

BACKGROUND OF THE INVENTION

In today's world, computer interfaces employ GUIs (graphical user interfaces) created by programmers. To use these, a user must remember what each cryptic icon means and memorize the tree structure interface. A user can write notes about the interface to help remind them how to use the program and more specifically how to solve a particular task with the program. But the notes or reference books are separate from the program. It is this separation that makes the documentation not as helpful as the user would like.

Furthermore, there are large segments of the population who are not comfortable with computers as they exist today, and either do not use them to the level they might, or refuse to use them because of perceived complexity or other factors. The closest many people come to a computer is an ATM machine, which often employs a touch screen, widely regarded as the one of the most intuitive of conventional computer interface approaches. We know of no system, which is both simplified and variable in a manner, somewhat like a touch screen, while at the same time operating using innately familiar methods and materials, as does the invention.

Previous inventions by the inventors described an invention having some features of a touch screen, which uses a TV camera to view pages of a book. The instant invention carries this forward in new and useful ways. A search of other patents and applications having these components has turned up no prior art, which directly applies. One peripherally applicable prior art reference, which uses a touch pad and a paperboard, is Chan, U.S. Pat. No. 5,088,928. Another application, in which a TV camera takes a picture of a persons face to insert in a board game, is Ali, US Patent application publication 20030100363.

SUMMARY OF THE INVENTION

The invention herein primarily concerns improvements in computer interfaces for use by the general population, and gives a user a simple means of controlling computer programs or devices controlled by computers. It is simple in that the user can personalize the control interface without need for programming.

The invention solves the documentation problem described above by making the users documentation the computer programs interface. It solves the familiarity problem, by making a familiar item, writing or pictures on a piece of paper, act as the means of starting a computer and performing the actions needed without requiring the user to utilize the computer or a device such as a mouse or keyboard. The user inputs information using his finger or an instrument such as a pen, and may optionally augment this action using his voice. Output of information to the user is by voice synthesis or a convenient flat panel, Television, or other display.

One preferred embodiment of the invention uses a book, whose pages viewed by a TV camera (or perhaps another electro optical sensing device), which inputs to a computer the page number (unless the user inputs it), which page data is used to call up the database for that page. The TV camera and associated computer also identifies an action of the user, typically pointing at either instruction icons, or action icons on the page having the page number identified. The book is typically a loose-leaf notebook or a pre bound notebook such as a spiral notebook. Preferably, the binding used, if bound, allows the pages to lie flat for best viewing by the TV camera. The book is composed of at least some pages of value to the user. They can come from anywhere, and can be pre-printed to order by the user or a helper, from information stored remotely, or on media. Where the book has been pre bound, it may have been obtained from a source who wants it used in a certain fashion with particular pages.

It should be noted that the pages of a book of this type are typically 8½×11 inches if North American, and a somewhat larger A4 size if European. Both are larger than most touch screens or tablet computers, and thus are both easier to use, and much more portable in their basic form. And they individual pages are ultra low cost. So if they are lost or marred (E.g. by spilled coffee) the cost is minimal to replace them. For many people, this is a major advantage.

An alternative embodiment for crowded areas positions a page vertically, and in a preferred embodiment the page or pages are located in a slot on the side of a door, for example a refrigerator door, which may also incorporate a whiteboard area for writing notes, which may be recorded by the camera. The camera is located on a boom or alternatively the camera and an optional projector of the invention are located in the ceiling overhead and positioned to view the page or pages on the door.

Another preferred embodiment accepts via a slot or other presentation means, single sheets of paper, plastic or other material on which data has been entered, which data is viewed by a TV camera within a housing of the device. A color TV camera is preferably used to allow colored marks and symbols to be recognized. This device can serve many purposes such as those mentioned below and elsewhere herein.

A basic suite of functions for a person desiring minimal interaction with a classical windows type computer is to fetch email, send email, fetch recipes or other information typically desired by the user from appropriate sources in a computer or on the internet, and make telephone calls and control the TV and other household audio visual functions. With the exception of the phone, these are all things, which have been difficult for some users, and are made simpler with the invention. With its simple, and common user interface, the invention can also be used to set the controls of a multitude of devices in addition to the audio/visual systems, such as sprinkler timers, light timers, security systems, heating and air conditioning controls and the like, the number and complexity and disparate instructions for operations of which have been vexing to many. The settings can be made in a digital or analog manner, as desired. The settings made can be stored in hard copy form as paper pages, and used at a further time to make the same settings, without the need to access the associated computer.

The output of the invention in its basic form is a loudspeaker and printer, the latter typically located near the computer utilized, which may be remote from the user input workstation. Optionally a display can be provided, such as an LCD flat panel display or a projected display.

The invention herein also concerns new forms of simple and low cost camera based computer interfaces for use, particularly by senior citizens, handicapped persons and others who are uncomfortable or unable in using computers and computer applications, including Internet applications, in the form they exist today. As noted, preferred embodiments utilize a TV camera and computer to gather information from a page and act on the information, transmitting or storing information in response to the sensed data. In some cases additional information such as the location of a pen or finger on or near the paper is sensed in order to command an action desired. And in still further embodiments, pen (or other writing instrument) or finger position can be actually digitized as well.

The invention can also serve not just senior citizens and others who are unhappy with or unable to deal with the technical complexity of the "computerized" systems of today, but can also serve those who are handicapped. Illustrated for example is a page particularly suited for those having vision difficulties, which either has large writing, large action spots, Braille characters or all three. Caregivers can easily prepare the pages at low cost on a Braille printer to make operation easy and personalized for the individual.

It is a goal of the invention to help those who have trouble with computers as they exist today, to gain all the advantages necessary for their lives, and to enable key applications such as TV watching and music listening, Health, Email with children and others, and Banking/bill paying, and do them easy, fast and well.

It is a goal of the invention to provide adequate space on the page for the individual user to write comments germane to the use of the page, or in some cases to attach clippings or photos germane to the page, or in general.

It is a goal of the invention to provide means for the creation of pages of the book of specific value to the user, to further include the database for the pages downloaded, and the use of the pages once created.

It is a further goal of the invention to provide TV camera and computer based means to register desired inputs, activate functions of the system such as launching programs and entering or retrieving data.

It is also a goal of the invention to achieve a portable apparatus incorporating a TV camera including a convenient clipboard and notebook It is also a goal of the invention to achieve a very low cost, and convenient portable method by which users can record data for later entry at reading station having a camera.

It is a further goal of the invention to provide a method for delivering information back to a user who has entered data using the camera of the invention, by simply printing out the information needed or projecting it on a surface.

It is also a goal to provide new methods for recording and entering data in hospitals and other locations.

It is also a goal of the invention to provide new and easy to use methods for sending emails without typing or dealing with a computer.

It is a further goal to provide a portable device for recording information, which can be read out by a TV camera of the invention.

It is also a goal of the invention to provide convenient methods for mounting and arranging the components of the invention in a kitchen of a home or other location.

It is a goal as well of the invention to provide a device and method of operation, which is intuitive and easy to use by Senior Citizens and handicapped persons.

It is another goal of the invention to allow easy and fast handwriting and picture transmission, especially for those who seldom if ever use a computer.

It is a further goal of the invention to provide a secure method for using internet based services by those who are not familiar or able to operate computers.

It is also a goal of the invention to provide a method for persons in vehicles to interact with vehicle controls and telematic sources.

It is a goal as well to illustrate a method for computer entry, which uses markers, or marks, which can be read at a later time by a camera when the field of view of the camera is not obscured.

It is also a goal of the invention to provide a very easy to use apparatus for use in the home.

It is a goal as well of the invention to provide a device and method of operation, which is intuitive and easy to use by Senior Citizens and handicapped persons.

Further features and advantages of the present invention will be set forth in, or apparent from, the detailed description of preferred embodiments thereof which follows.

BRIEF DESCRIPTION OF THE DRAWINGS

FIG. 1b illustrates an alternative embodiment of the invention incorporated in a door for example a refrigerator door or a kitchen door;

FIG. 1d illustrates a VCR programming embodiment in this example employing the apparatus of FIG. 1c;

FIG. 1e illustrates one example of a typical page of the invention;

FIG. 2a illustrates a comprehensive loose leaf binder based home application, incorporating home control, media control, communication, health maintenance, and user interest application features which may be utilized in the workstation of FIG. 1;

FIG. 3a illustrates one example of a furnace control action page of the invention used in the apparatus of FIGS. 1 and 2;

FIG. 3f illustrates one example of a "health maintenance" action page of the invention used in the apparatus of FIGS. 1 and 2;

FIG. 3g illustrates another example of a "health maintenance" action page of the invention used in the apparatus of FIGS. 1 and 2;

FIG. 3h illustrates one example of a "scrapbook" action page of the invention used in the apparatus of FIGS. 1 and 2;

FIG. 3i illustrates one example of a "recipe" action page of the invention used in the apparatus of FIGS. 1 and 2;

FIG. 4a illustrates details concerning the sensing used in figures above;

FIG. 6 illustrates a video image projector used as an alternative to the LCD display of FIG. 1, and projecting for example, directly onto the page used, or the back of the page adjacent. Also illustrated is the use of an OLED type display, which is provided, on the inside cover of the notebook or as a "page" of the notebook;

FIG. 7 illustrates a doctor's aid or hospital room chart application, further illustrating the use of color in hot spots on pages, and the email of handwritten documents using the invention;

FIG. 11 illustrates an alternative input arrangement in which a page of the invention is placed on an Action Board;

FIG. 12 illustrates an alternative method for determining the page which the camera is looking at;

FIG. 13b illustrates a remote version of the device of FIG. 13a.

DESCRIPTION OF THE PREFERRED EMBODIMENTS

Currently the user of a computer must focus on a computer and how to navigate the software interface. The disclosed invention instead focuses on a job the user is trying to accomplish. You insert or flip to the page that accomplishes the task and swipe the hotspot whose words describe your task and the system will read the page number, identify which book the page is part of and then execute a sequence of commands within a computer to complete the task.

Figure 1A:
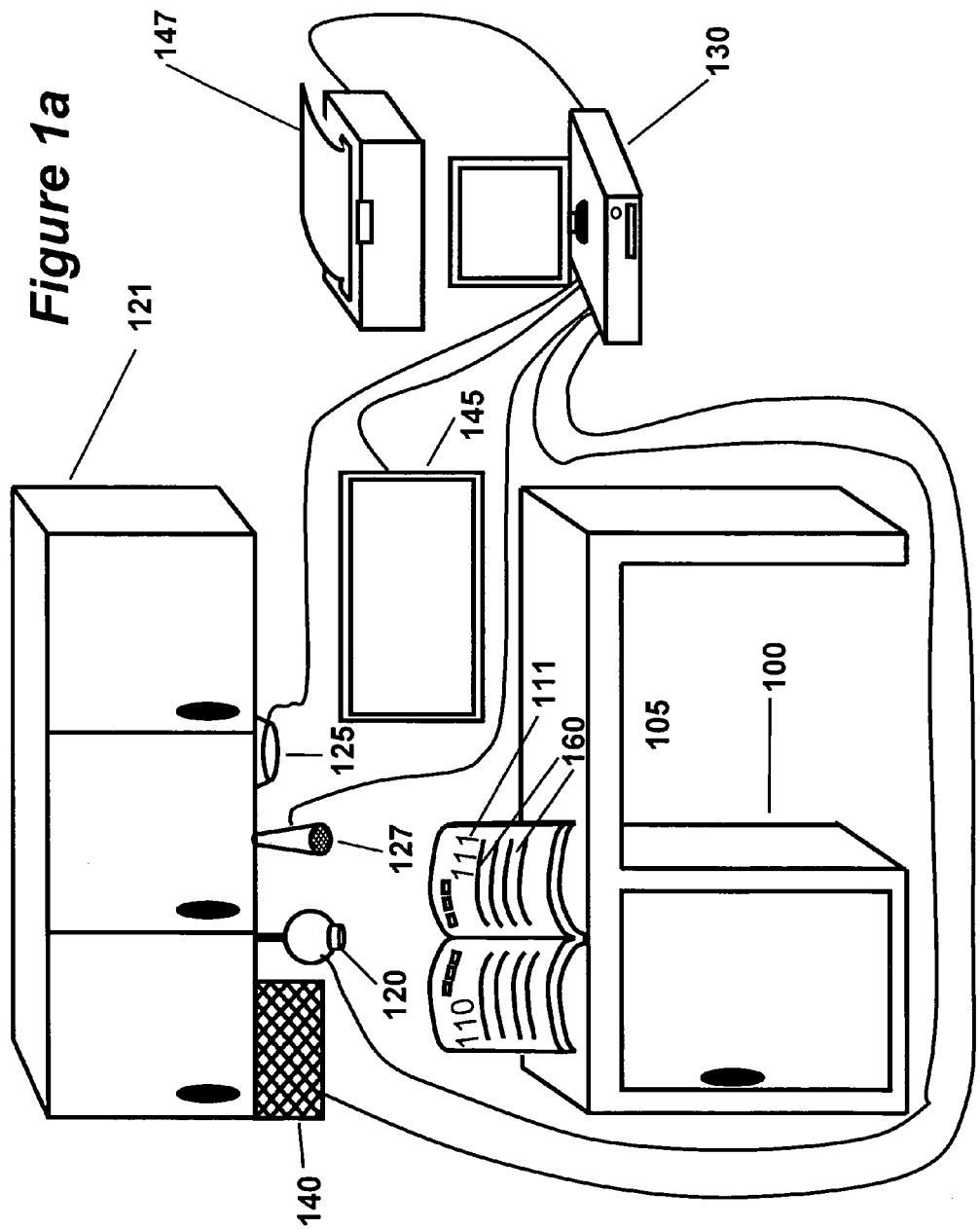
FIG. 1a illustrates a basic embodiment of the invention incorporated in a workstation in a kitchen and employing a TV camera and computer.

FIG. 1a illustrates a basic workstation of the invention, used in a kitchen. The kitchen or an adjoining region nearby is one of the most likely places for use of the invention in the home, because the homemaker spends a lot of time there, is quite busy, and is typically not particularly habituated in computer skills of the conventional variety. In some cases the person is indeed anti-computer or technology, and the familiar non-technical look and feel of the invention is a real benefit to them.

As shown a small desk 100 in the kitchen is typically located near the phone, but not necessarily. On the desk the user places a book 105 of the invention, whose page 160 has a page number 111 of which, being visible in this example having pages printed on only one side. The page 111 is viewed by a TV camera, 120 above attached to a cabinet 121. The camera is connected to computer 130, which is preferably located out of sight on top of the cabinet. A pot light in the kitchen (not shown) illuminates the desk and book. Other lights such as led lighting for example can be provided such as white LED 125 attached optionally to camera 120. A microphone 127 is interfaced to the computer and allows input of voice information by the person, when the invention is used to command this action. Information of this type can be recorded memos, commands to be recognized by voice recognition systems such as the dialing of a voice inputted number, and so forth.

Optionally the camera can record images of handwriting, which can be analyzed using handwriting recognition programs. If the writing is large and clear, this can reliably be used for simple commands, or to create emails for example. The output of the computer 130 is primarily to two devices, a loudspeaker 140 and an optional LCD flat panel display 145 or other suitable display, for example the projector or OLED devices disclosed below. Other characteristic computer output devices such as printers (for example optional printer 147), modems etc can also be employed.

The user places the book on a surface, such as a counter top or desk 100 in this case, below the TV camera whose focus is preferably set at the distance from the camera to an average page position of the book when so placed. The camera obtains an image of a page of the book and the image is typically stored in memory and analyzed by suitable programs in the computer 130. In software, the image may be rotated or translated if necessary to account for any out of position of the book and sufficiently aligns and normalizes the page image to that stored for reference in the computer data base for that page (which has been downloaded from storage media or a relevant internet web site for example). The translation, rotation and other adjustments needed are relatively small, if the book can be placed up against a stop positioned on the desk for the purpose, and the camera axis is substantially perpendicular to the book page.

FIG. 1b illustrates an alternative arrangement located on a door, for example a refrigerator door 150. This is useful for crowded areas, and positions a page such as 153 vertically on the door. In a preferred embodiment the page or pages are located in a slot 155 on the side of the door 150. The door may also incorporate a whiteboard type area 157 for writing notes, which may be recorded by the camera 160. The camera of the invention is located on a boom 162 or alternatively a camera such as 164 and an optional projector 165 are located in the ceiling over head and positioned to view the page or pages on the door. The projector can be used to project data right onto the page itself, or to a region next to it on the door, if desired. This region can be desirably made of reflective material such as used in movie screens for example. Alternative to the projector, and LCD screen such as 145 can be located above the Fridge or on the door itself, if wiring can be provided.

A basic suite of functions for a person desiring minimal interaction with a classical windows type computer is to fetch email, send email, fetch recipes or other information typically desired by the user from appropriate sources in a computer or on the internet, and make telephone calls and control the TV and other household audio visual functions. With the exception of the phone, these are all relatively unfamiliar things, which have been difficult for some users, and are made simpler with the invention. (Remember the famous VCR programming problem?). The invention, with its simple and common user interface, can also be used to set the controls of a multitude of disparate devices in addition to the audio/visual systems, such as sprinklers, security systems, heating and air conditioning and the like, the number and complexity of which have been vexing to many. The settings can be made in a digital or analog manner, as desired. The settings made can be stored in hard copy form as paper pages, and used at a further time to make the same settings, without the need to access the associated computer.

The output of the invention in its basic form is a loudspeaker and printer, the latter typically located near the computer utilized, which may be remote from the user input workstation. Optionally a display can be provided, such as an LCD flat panel display or a projected display. The apparatus of FIG. 1b can operate just as that in FIG. 1a, namely with a finger touch sensed by the camera in order to designate to the computer which action function and which hot spot or spots have been selected by the user. A novel alternative embodiment for operation on refrigerator doors, and other steel doors, or sheet steel boards attached to regular doors or walls or other surfaces is now disclosed.

Figure 1C:
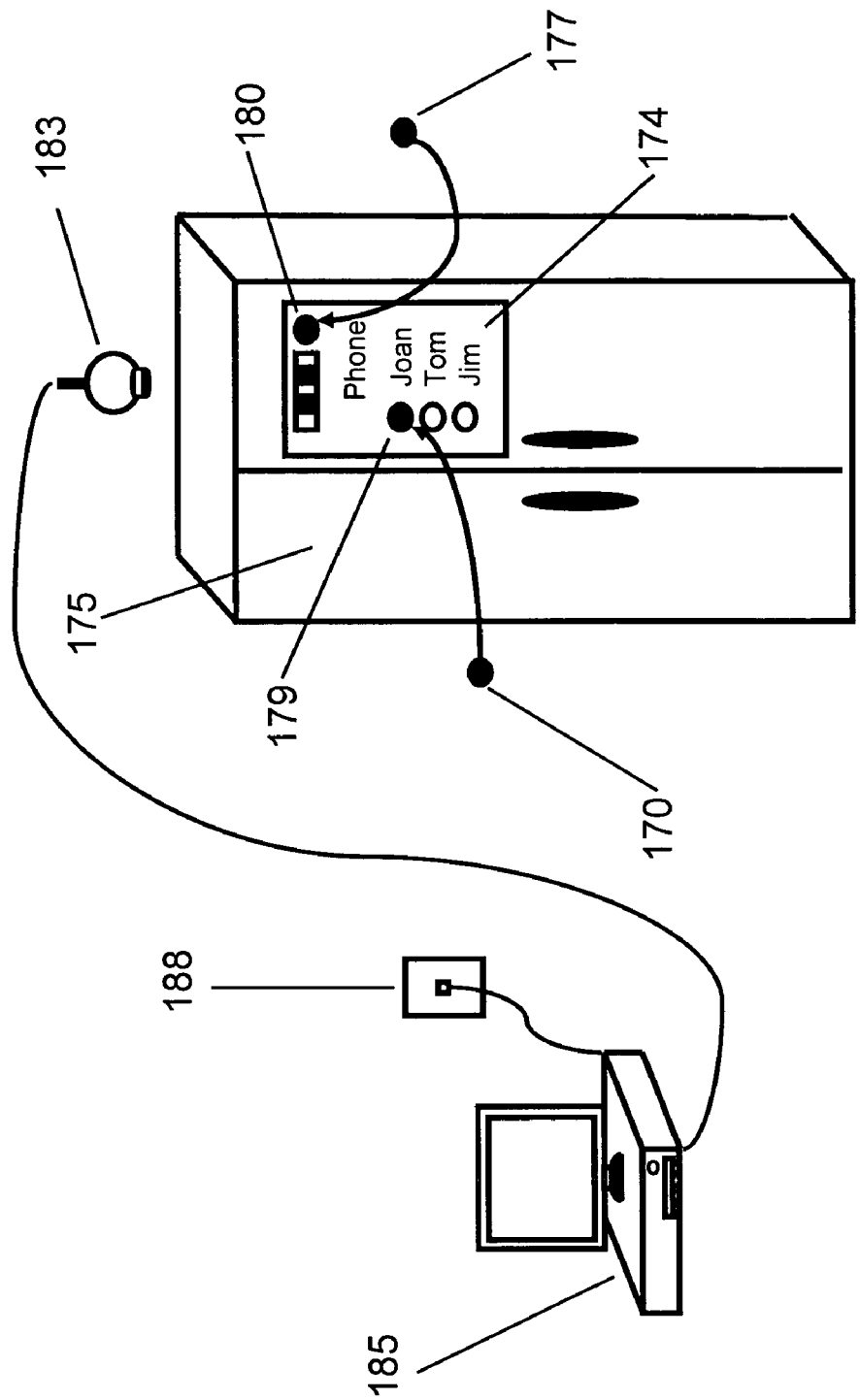
FIG. 1c illustrates magnetic targets utilized with the apparatus of FIG. 1b above in order to register a desired input or command.

FIG. 1c illustrates magnetic targets utilized with the apparatus of FIG. 1b above. In this case a magnetic target marker 177 is placed on an action function TELEPHONE 180 of page 174 on fridge door 175. The user places a second magnetic marker 170 on a hot spot 179 next to the name of the person to be called, in this case Joan. When the camera 183 has a clear view of the page and targets (realizing the person may in the case of the overhead camera shown obscure the target at times) the data as to target location on the page as well as page identification is taken, and the phone call placed by computer 185 via modem 188. The target, such as 170, has preferably a high contrast (color or brightness or both) to the surrounding page such that it can easily be identified and its position determined.

In a second example, shown in FIG. 1d, the user wishes to select the time to start recording a TV show, and the time to stop. In front of camera 196 the user places page 189 which is for TV 193 function and VCR 194 recording in the front of the slot. Even if several sheets are in the slot at once, the magnet has strength to go thru them all and hold to the fridge (especially if a rare earth magnet). The magnetic target markers may be stored by magnetically attaching to the fridge when not in use. The particular page shown is only for programming the VCR function, and even more specifically only for the 4 favourite channels of the person, 2, 4, 7 and 9. In other words when the user wants to program the VCR for a particular program, he or she gets this page from a file (or turns to it in a notebook holding multiple pages of the invention) and presents it to the camera.

As shown, the start recording time selected is 9 pm and 10 pm for stop. In this case different magnetic targets are shown for illustration, the first 190 coloured blue is used to start recording by placing it on the time line at the time desired (9 pm). The second, 191 coloured orange is used to stop, and placed at the appropriate time (10 PM). A third, 192, coloured green is placed on the desired channel to be recorded, in this case, Channel 9. Thus three targets are placed by the user, and serve to unmistakably ensure that the VCR works as desired. And anyone looking at the page can immediately see when the action is to occur. If only one start stop function is needed, it is not necessary to code (in this case via a color code) which marker represents start and which is stop, since clearly the start has to proceed the stop in time Should it be desired to now do another function, for example call another person, or send an email, the appropriate page can be placed in front of the VCR page. In this case the camera stores the image of the VCR page for later recall, both as an image, if desired, which can be printed out on the printer 197 driven by computer 185, or displayed on an optional display, and as a voice output which can speak the current settings, when a VCR status related function is indicated on another page.

Some alternative locations in kitchens and other rooms are disclosed in FIG. 10.

The hot spots and action functions can be round dots, but can also be designs such as flags, or any other desired descriptor that can be observed by the TV camera to be indicated by the action of a finger or marker, or changed thereby. A hot spot can also be an arrow or other indicia, which has a beginning and end the touching of the portion of which signifies that for example a recording begins, or a recording end, at that value.

A typical page is shown in FIG. 1e this has a code at the top of the page indicating what page it is, which each page in the system having its own data base in the computer. Along one side, in this case the right hand side, are arrayed action functions, which are typically covered up by ones finger or a marker, or coloured over (or eliminated), to indicate there selection for a given action at a given time. Another set of "hot spots" is shown which typically lie next to handwritten or printed information relating to detail relating to the action desired. For example a name of a person whose action is to get email from or send an email to. In another case as shown at the bottom the detail may be the numbers 0-9 for example, used to be touched in sequence to dial a phone number or enter some other numeric piece of information.

An arrow shaped hot spot having another type of function is also shown on FIG. 1e. In this case, the person touches it at the left end, and moves the finger toward the right end. The camera and image processing computer software associated with it senses this gesture, which unmistakeably indicates that it was desired to touch this hotspot. Other gestures can be used as well, such as up and down, circular or the like.

One can touch a hot spot and an action function at the same time to indicate a desired command, a step, which requires typically a finger of each hand. Alternatively, the system for that page could be set up to register if the action function is first touched, and then the hot spot, over some time duration of input window. Other ways of sequencing can also be used to indicate to the system that a correct command should be entered.

It is noted that sliders or even rotary knobs can be built into pages, or the holders of the pages, which can be easily seen by the camera (similar to the magnet markers), and used to input functions to the camera, for example temperature. These sliders can be made of paper or metallic or plastic or other materials.

Figure 2B:
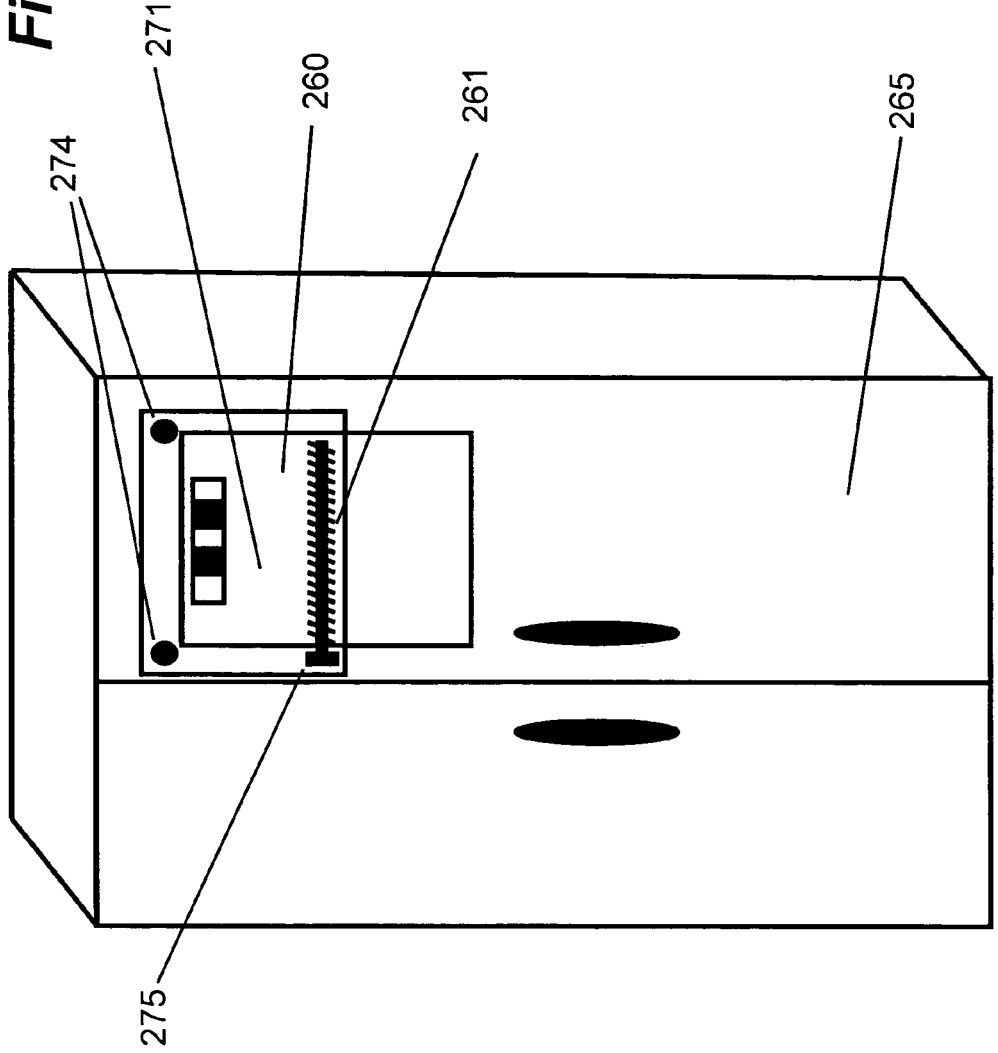
FIG. 2b illustrates a spiral bound notebook of the invention.

FIG. 2a illustrates further such a comprehensive loose leaf binder 200 for an in-home application, what we call MY PERSONAL INTERFACE, incorporating, to the extent the user desires, pages having home control, media control, communication, health maintenance, and other user interest application features such as connections to recipe sites or other sites on the internet which may be utilized in the workstation of FIG. 1. Someone, generally a family member, but possibly the user themselves, or a health care worker, helps prepare the notebook with the pages desired and useful to the user. These can be as many or as few as necessary, interspersed with other information as desired, for example scrapbook pages. The action pages worked using the invention are desirably, but not necessarily, indicated by tabs so they may be easily turned to by the user. In this example of figure two, the tabs are Furnace, TV, Radio/CD, Phone, Email, Fiber diets, Weight Watchers, Scrapbook, and Recipes.

It is also envisioned that the notebook preparation person can in the future buy pre-printed pages, or download them from the net for printing on ones own computer printer. Assistance programs to aid in preparation can be sold on CDs or DVDs, or other media, or accessed on the net. On a page such as 211 is a page number 212, also including a machine readable page number, 213 which can be an OCR readable page number font, a bar code representation, or as shown on page 211 a simple, colorful and pleasing color bar code, used in conjunction with a color TV camera 220 and suitable color recognition software (or optionally, an OCR or bar code recognition program) in computer 130. When the user turns the page to a new page, the computer reads that page number and links information on it to a database for that page.

The person using the invention then may do several steps as desired. The simplest case is just to point at one of the hot spots such as pre-printed dot 235 on the page, which have commands or information written beside them or on them. This information can be pre-printed, or handwritten, or drawn, whatever works for the user. Typically there are 10 and often as many as 30 such hot spots on the page, denoted by subtle markings on the page visible to the user and the camera, but preferably not obtrusive and distracting. In one illustrative example, discussed further below, the names of family members are written next to each hot spot on a page, and on the right hand side of the page are action functions such as 240-244 relating to the family. Examples of action functions 240-244 are to telephone the person, to get email from the person, to send email to the person, to record a memo for the person, enable a voice recognition system based function, and so forth.

The page of the book can also have letters or numbers on the page and hot spots associated with each. For example the numbers 0-9 shown in a row or rows across the bottom of the page 211 can be used to dial a phone number, by using ones finger to touch a spot, detecting lets say that the 5 spot was touched, indicating via the computer to the user via a voice feedback the number 5 from the loudspeaker, and then in sequence touching the other numbers needed until the total number was inputted at which time the computer dials the number via a modem phone line connection. This same technique works in any language or for any purpose. Hot spots can be for any thing desired, as long as the users input can be sensed and the operation physically performed by the computer. As another example, a page can have 26 hot spots for the English alphabet for example, and thus the just described operation can be used as a keyboard, albeit slow.

A typical book is a loose-leaf notebook, which has been personalized for the user. That is to say, the pages relate to functions and data that the user wishes to have conveniently located for use, in what amounts to a favourite location and format. Pages of the book can be intermixed too, with some action function with the invention, and others just data pages, for example holding pictures, recipes, or whatever. The camera and computer when it sees the page number code knows that that page is a function related page used for computer input or output.

Alignment and calibration can be with respect to an individual page, or to the notebook binding or outer cover, if those are related to the page location, as they generally are. Plastic sheaths can be used, if sufficiently clear, to protect the pages. Attention in some cases needs to be paid to guard against unwanted reflections of lights in the room to the TV camera from these sheaths. When external devices are controlled, the computer requires requisite I/O (inputs and outputs) to operate the device, such a furnace, TV, stereo, sprinkler, lights, or the like.

It should be noted that a multi-page book type interface of the invention can also be mounted to a door, for example with the pages turning in the vertical direction. For example, consider FIG. 2b, which shows a spiral bound book 260 having the binding 261 running horizontally across the fridge door 265. The pages not in use such as 270 are turned to be below the one in use such as 271. The page 271 is held in place by magnet(s) 274. The binding of the book also can be magnetically attached by magnetic rod holder 275, for example.

It is noted that whether mounted on a door, or on a clipboard or laying on a counter, or whatever, a page holder can have magnetic discs at the hot spot and/or action function locations, which serve to attract magnet markers to those hot spots. Pages with magnetic discs can be inserted into a notebook every $10^{th}$ page for example, and used for the 9 pages above them, if sufficiently strong magnets are used (and assuming the hot spots on all those pages are in the same location—a simplification for ease of use, and image processing, which is not however necessary for function of the invention).

FIG. 3 provides further details of representative potential action pages of FIGS. 1 and 2. FIG. 3a illustrates a furnace control page, which also serves to illustrate the connection of times with functions desired. In this case the function is temperature at a given time, but it can be operation of timed items such as light controls, sprinkler controls and the like. And it also can serve to provide alarm functions, for example when someone needs reminders to take medicine at certain intervals. The page of FIG. 3a has at the top the page 300 a page number code 301 which links it to a data base in the computer 130. The data of the page number is acquired by the camera 120 and analyzed by computer 130. The database associated with the page identifies it as a furnace control page, which is used to output data from computer 130 to an interface on the furnace. This relates to when to turn the furnace cycle on or off. And in the summer, air conditioning if present. It is assumed that the furnace itself controls particulars of the cycle, and the invention here is only controlling the on time, off time, and temperature settings.

Because the page 300 is large, in comparison to the limited display space of typical thermostats, it is possible to show all schedules at once for ease of comprehension and appropriate action is simplified. As shown, is the schedule for all the times for weekdays and weekends, as well as the range of temperature settings one can have. In one illustrative embodiment, there are two action functions which can be initiated by the user. The first 303 is to just inquire what the current temperature is which answer can be spoken by the loudspeaker of the invention. The second action function, 302, is used to set desired times after which a temperature will be held at a set amount until a further time when another temperature is desired. While shown for one day only, another hot buttons could be cued for other days of the week for example. Or a separate page for each day could be used.

Figure 4B:
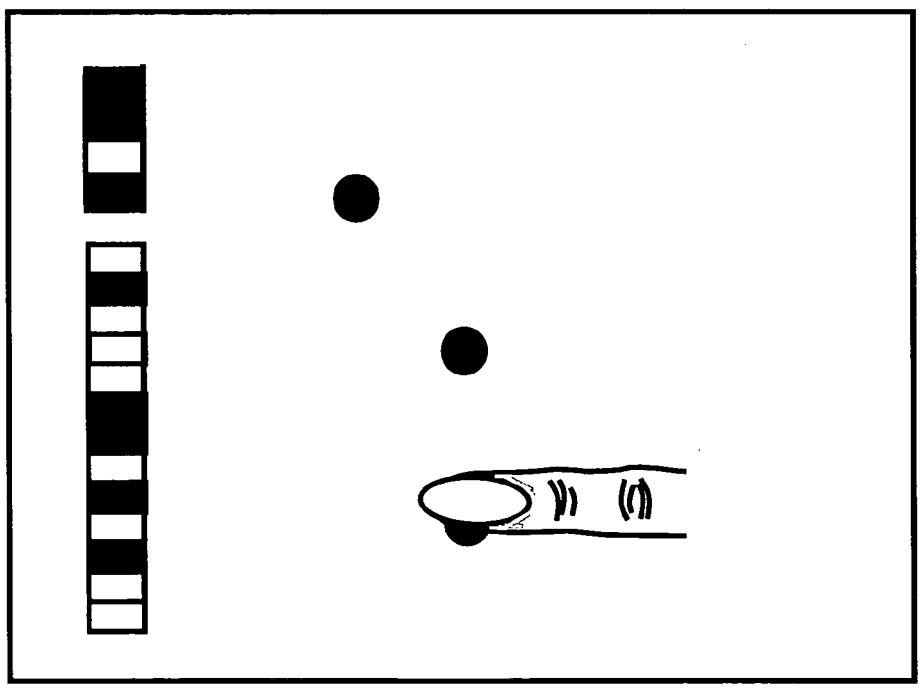
FIG. 4b illustrates further details concerning the sensing used in figures above.

To set temperature at desired time, you simply push a finger 305 of your left hand on the time, for example 7 am, and a finger 306 of your right hand on the temperature, for example 74 degrees. The TV camera 120 senses the presence of your finger (see FIG. 4 for further details), on both of these functions and the computer then knows via its program to read this as a new input. If you want another setting at another time, for example on going to bed, you just put your fingers on say 10 pm and 68 degrees. In the example shown, the temperature and time are arranged in bars (in this case vertical to minimize obscuration, though they can be horizontal), and are touched at the desired point along their length, which touch location is sensed by the camera in an analog fashion. In other words there is no hot spot per se, but rather a continuous succession of points along the bar that can be used as input, with resolution of same dependent on the camera resolution, lighting variables, and image analysis program. Highly precise measurements are seldom required for most applications in the home, so the accuracy of finger location determination is seldom a problem.

Alternatively one can use fixed hot spots of for example even intervals of time and temperature. For example 68, 69, 70, 71 and 72 degrees, with each choice corresponding to a specific hot spot. In this case the image-processing program, rather than digitizing the vertical location of the finger touch (or marker location etc), need only determine on which hot spot, if any, is a finger present. A further control, initiated by just touching an appropriate hot spot on the right hand side of the page, for example, allows you to determine what setting it is at now, which is indicated by a voice response or optionally on a LCD screen in easy to read letters.

Figure 3B:
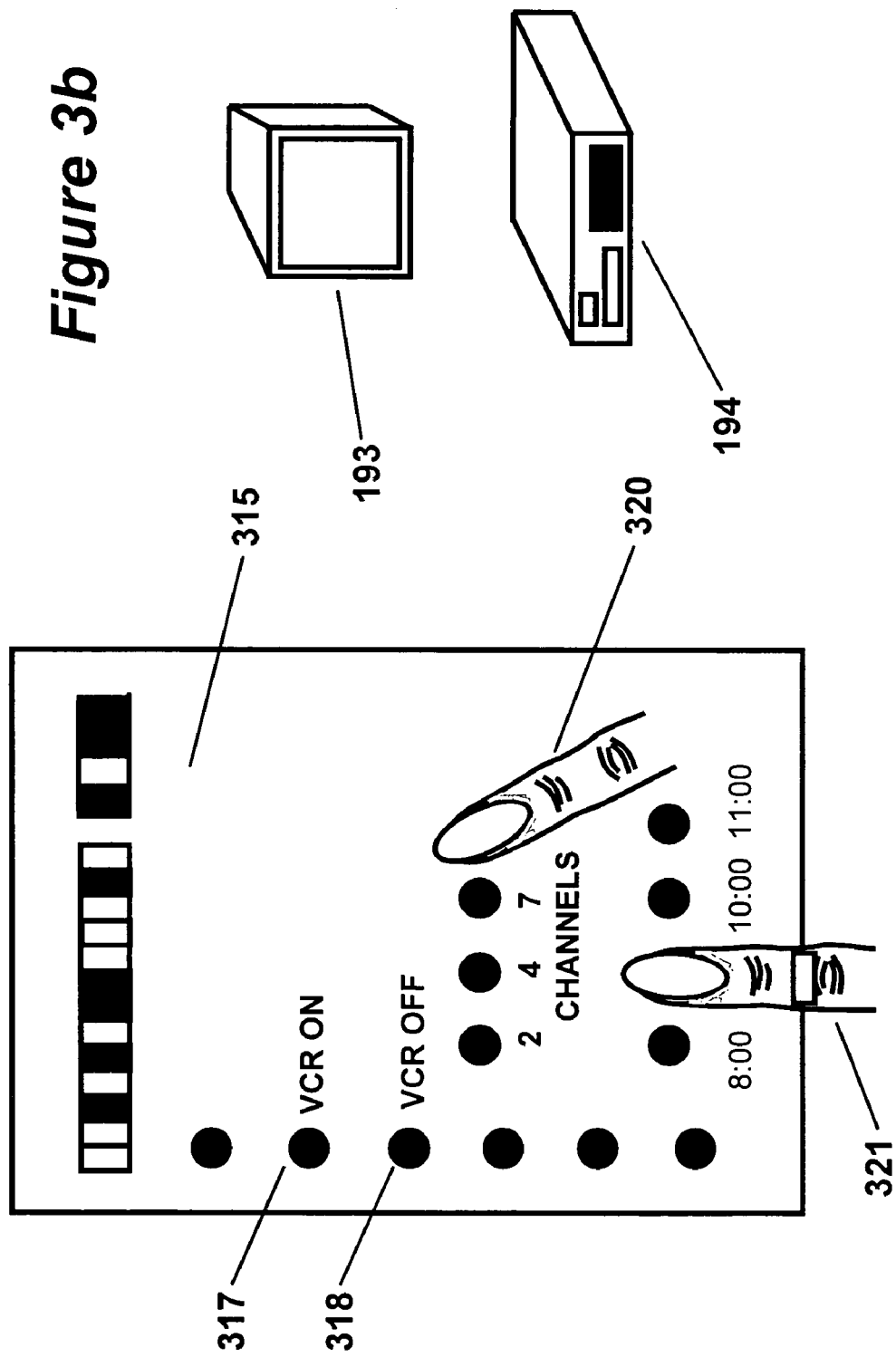
FIG. 3b illustrates one example of a TV and DVD control action page of the invention used in the apparatus of FIGS. 1 and 2.

FIG. 3b illustrates a page used for control of a TV 193 and DVD player 194. FIG. 3b illustrates a page 315 for operating the TV and DVD player, and a recording device such as a VCR or DVD recorder. Essentially this page replaces the classical remotes, though it can be used in addition. For actually recording shows this answers the classical problem in the same way as the furnace control of FIG. 3a. Touch the action function 317 for example turn on the VCR, and then touch the channel number with one finger 320 and a desired time with the other finger 321. To end recording, touch the action function 318 to turn off recording and touch the time to turn off with finger 321. For just changing channels just touch the channel or the DVD channel. Where large numbers of sources are present it could be desirably to have logo of the channel, e.g. a discovery channel printed on the page. This could be downloaded from the Internet, from the satellite or cable provider for example.

Figure 3C:
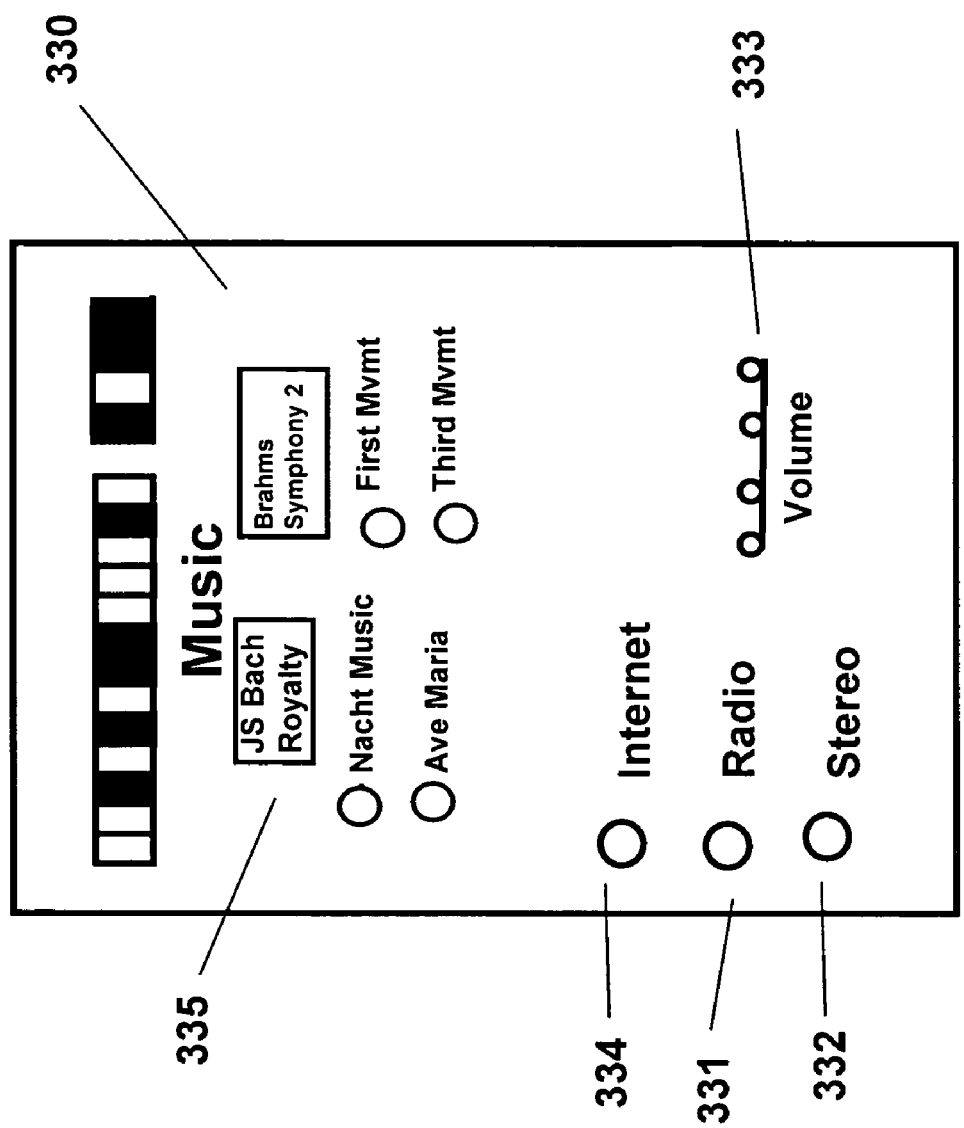
FIG. 3c illustrates one example of a Radio and Stereo control action page of the invention used in the apparatus of FIGS. 1 and 2.

FIG. 3c illustrates a page 330 used for control of a radio 331 and stereo 332 including CD player. This is much the same as the TV and adjustments to be entered can be volume 333, treble and bass, station tuning, preset functions, etc. The page idea allows one to personalize the page by having for example pictures of CD album covers 335 next to the hot spots. A page can also have controls to access Internet 334 music sources such as Napster, and down load music if desired. The page can contain information as to tracks desired, composers, artists and the like. In one illustrative example, someone for example a caregiver, can download from a music site such as Napster or Music match, a list of their recordings, including tracks and other data as desired. This list can be used to make up a page of the invention, for example for one composer that has all of the pieces available, or some subset thereof. Next to each piece, is placed a hot spot of the invention, which is used by the user to access the site. For example, the page number code can from the computer database indicate that this is a Napster access page, and that it is for J. S. Bach, and that the hot spots correspond to the stored choices available on Napster. So when the user wants Bach, he or she goes to the file folder of pages and picks up the Bach page and inserts it in a workstation slot or other wise presents it to the camera of the invention for action. The action can take place automatically simply on insertion, when the camera reads that it is a page of this type, for example having pre coloured in choices. One choice might be too sequentially or in random order play all the tunes available.

Figure 3D:
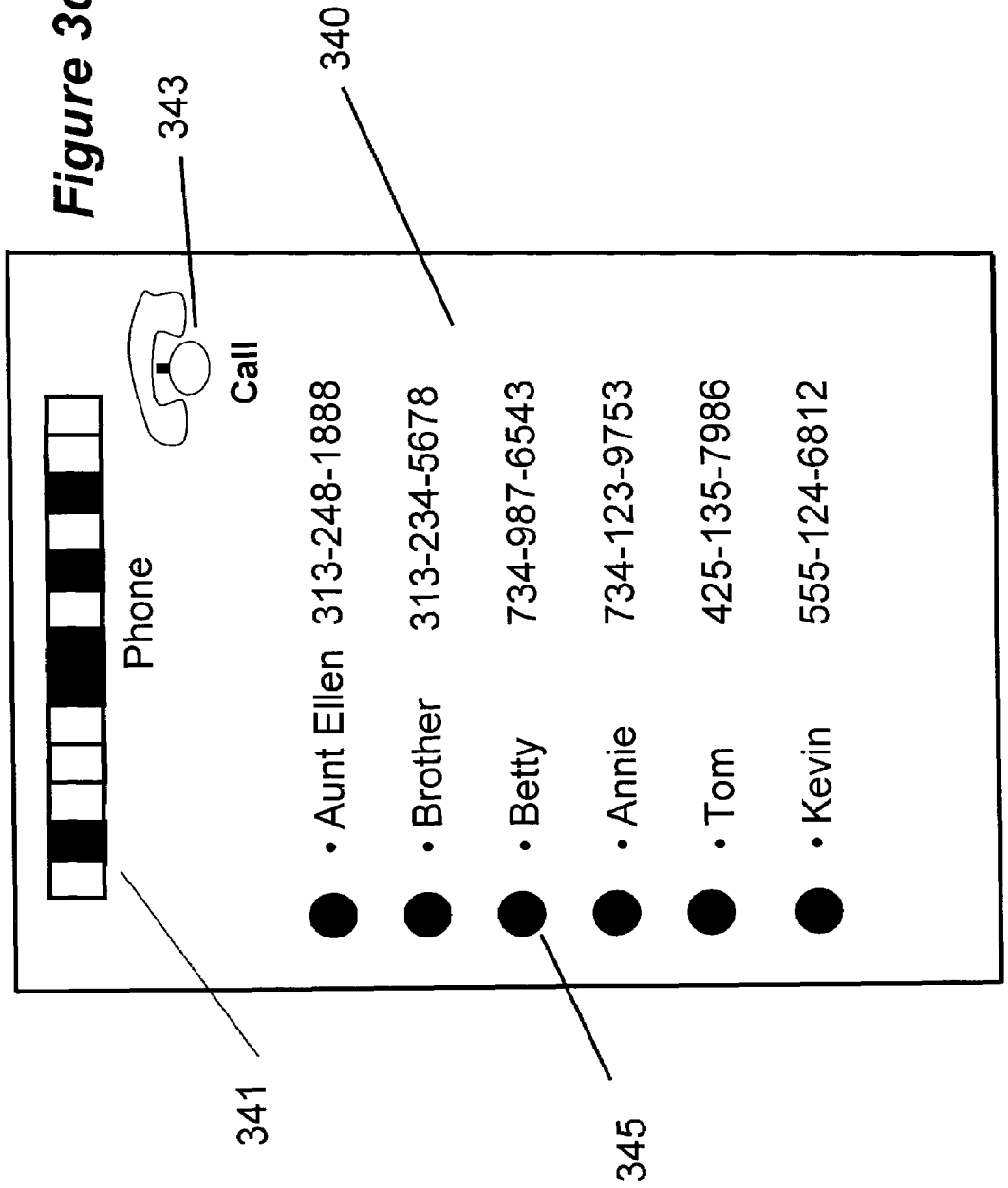
FIG. 3d illustrates one example of a telephone control action page of the invention used in the apparatus of FIGS. 1 and 2.

FIG. 3d illustrates a simple telephone interaction page 340, with page number code 341. This page is in essence a phone dialler in this form. The user writes in next to each of 10 (or more, or less as desired) hot buttons on the page (or successive pages if lots of numbers), the name of a person they wish to call. The phone number may be on the page too. But the number has been stored in the computer database associated with that hot button on that page. The user can then, in one way of programming it, just turn to that page, and touch the button next to the name of the person they wish to call. For example button 345 on the page 340, next to the name "Aunt Ellen". Or for additional security, one might touch a button such as 343 along the right side of the page 340 entitled CALL, with a big telephone sign, and then touch within a few seconds the name, in order to activate the call. When the signal is recognized, the computer dials the phone via a modem connection. The ensuing conversation can be hands free via the microphone and loudspeaker, or the user can pick up a handset.

Figure 3E:
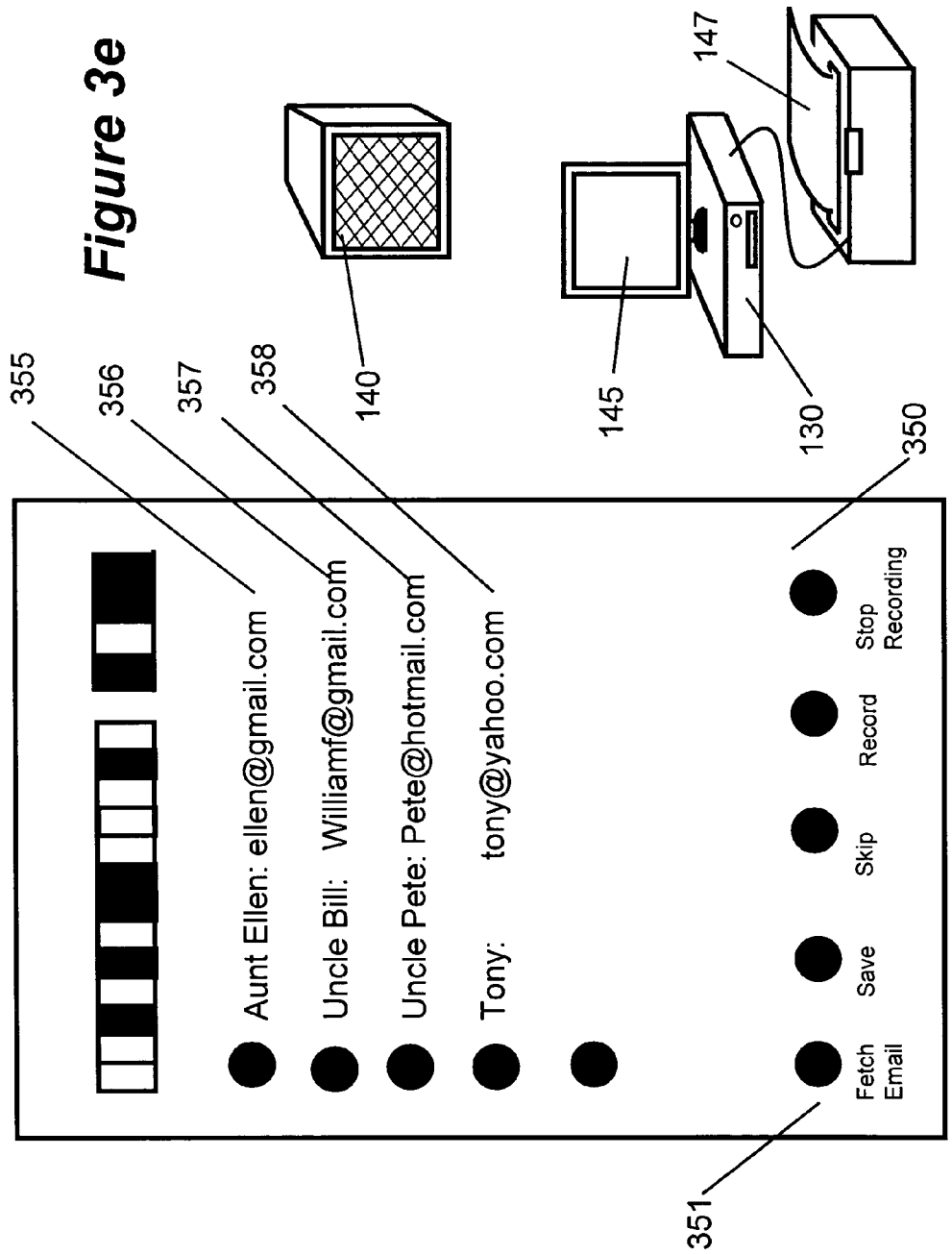
FIG. 3e illustrates one example of an E-mail action page of the invention used in the apparatus of FIGS. 1 and 2.

FIG. 3e illustrates a simple E-mail interaction page, 350. This in its simplest form is just used for fetching ones emails, and the page does only this, such as the Bach music download mentioned above. In the simplest case one just inserts a fetch email page in a slot or otherwise presents the page to a camera, and the system fetches all the emails for that day and prints them on a printer such as 147, or optionally displays them on a display such as 145. If desired, hot buttons on the page can be placed to only print emails from particular people, or to print emails from previous time periods. A caregiver or someone can also pre-program the system, or the email service, to filter out all emails but those from desired sources, and perhaps store the rest for later review by the caregiver.

Alternatively the page can be a general email page, for both fetch and send. In this latter case, and in the example following, the user touches a fetch hot button 351 and the computer 130 accesses the email account for the person and may print the emails as described above. Alternatively, it can display the emails on a monitor such as 145 above, or read them aloud via text to voice program over the loudspeaker 140. When the user wants to go to another email, he or she can push the save button, or skip, or other commands of the action buttons on the bottom of the page. Again a feature of the invention is that these can be in large letters which are easy to read, and spelled out with supporting info (which could also be handwritten) as to what to do to obtain ones emails, or other pertinent information.

For sending emails, a voice recognition (speech to text capability) or a keyboard is required if they are to be sent in text form. But we feel that for some users it may be desirable to just attach a direct recording or a still picture of a handwritten letter. In the former case for example, a recording can be a sound recording, or a video recording of ones self, saying the message in question. This can easily be done with the invention, by touching (or placing a marker on, or coloring in) a COMPOSE action function and talking into the microphone or standing in front of the camera of the invention. In one example, one can activate an action function "finish recording" when through (and one has moved out of the way of the camera).

To send an email to persons listed on a page, one activates the hot spot next to the person such as a family member s 355-358 listed on the page. In a manner just like on the phone dial page above, when the hot spot next to the family members name is touched, the computer gets the persons email address and prepares the email recording to be sent. When the recording is stopped, the message is sent. Optionally a keyboard can be attached to type emails, for those knowing how to type. A highly useful version for many older persons particularly, is the sending of a handwritten letter using the invention, which is described further in the section after FIG. 7.

FIG. 3f illustrates "health maintenance" pages 360-363 used for controlling weight. In one example, the page has on it pictures of some common diet items such as typical portions of foods for breakfast on page 360, lunch on page 361 and dinner on page 362, as well as snacks on page 363. When eating breakfast then, the person touches the meal item hot spot, as well as a hot spot function 365 on the right of the page relating to portion size. The person also optionally records using the recording action function on the/bottom of the page 366 (start) and 367 (stop) information relating to the experience, such as ate too much, had another bowl, etc. The computer 130 stores this verbal information and adds up the calories or other features such as fat content etc of the items eaten. At the end of the day, or at any point, the user can touch hot spots such as 368 and 369 which give a daily cumulative total or a weekly average to that point, to provide reference points for their progress through the day. Video clips of the person vocalizing the information can also be stored, if an optional web cam is used to take a persons picture. Encouraging words can be generated by the computer and spoken with the loudspeaker, if performance is exceeding goals, pre set in the computer.

FIG. 3g illustrates a "health maintenance" page 375 used for controlling fiber intake. A person having to have a proper amount of fiber in their daily diet uses this page. Operation is typically similar to the page above. On the page is shown in writing and pictures a number of foods, such as whole wheat bread, apples, etc. The user touches one after eating it, and this is recorded in the computer. At anytime during the day, the person can hit the SUM button and hear from a voice playback the sum of fiber grams to that point. At the beginning of the next day, a voice starts out with the sum for the previous day, and any suggestions for the day in question. This information can be automatically connected via the Internet or a modem to remote diagnosis and support medical teams if desired.

FIG. 3h illustrates a scrapbook page 382 having real pasted in pictures such as 383 and 384, and hot spots such as 385 associated with them for calling up from computer hard drive, previously stored pictures relating to the one pasted in (for example of the same persons in the immediate family). These pictures by necessity would need a monitor such as 140 or those shown below to display, though they could also be transmitted to a TV in another room as well. This scrapbook function can also be used to allow the person to record (as in the figures above) an audio or video recording to go with the picture pasted in. An audio speaker 386 is another typical component.

FIG. 3i illustrates a recipe page, which links handwritten notes on the page, to Internet sites having recipes for the indicated item. FIG. 3i illustrates a recipe page, 390 which shows hot buttons 391-395 next to which handwritten notes relative to food items such as crepes, meat loafs, corn and potatoes are written. When the hot button next to the food item is pressed, the computer links to Internet sites such as epicurious.com having recipes for the indicated item. These recipes are best displayed on a monitor such as 140, but can be either verbalized or printed out by an optional printer such as 147. (We have noticed our wives and to an extent ourselves relate more to the printed versions. This is more expensive, but not prohibitive if used in a limited manner). The invention can also serve not just senior citizens and others who are unhappy with the technical complexity of the "computerized" systems of today, but can also serve those who are handicapped. For example, the pages above can be made up in a manner particularly suited for those having vision difficulties. They can have high contrast writing, large action spots, Braille characters or all three. This page can be produced at low cost on a Braille printer and individualized for use by a particular individual. This provides them independence they likely cannot achieve with today's computers, at least for reasonable cost. Caregivers can easily prepare the pages to make operation easy and personalized for the individual. For those having difficulty using their hands the action spots can be super big, albeit with more pages required, or less functions per page, or larger pages (and larger camera field of view, which could imply a higher resolution camera).

FIG. 4a illustrates details concerning the sensing used in figures above. The TV camera 120 typically is used to acquire the image of a person's finger such as 401 touching a preprinted hotspot such as 405 on a page 410. The determination of finger presence on a hot spot can be determined by contrast of the finger color relative to the page color (either on a grey scale or color basis). Or it may by the finger substantially covering up or otherwise changing the image of a hot spot. Such an image change can be via shape change from a round hot spot for example to something different when a finger is in front of it. The criteria used, and thresholds or other methods for determining finger presence can be pre-programmed or even taught using the users fingers, and any secondary users fingers as well, if multiple users are present. The hot spot can be coloured in by the user themselves if desired, and does not have to be pre-printed. In this case the page with hot spots coloured in, but no fingers present is just shown to the camera and computer, and the image condition memorized for further comparison to test images in actual use, which may contain finger images or effects.

For determination of finger shape, an edge transform such as a Sobel transform can be used to process the finger image in order to determine its edges and from that tip location and thus the presence of it on a hot spot. For example, let us consider FIG. 4b which shows the image of a finger tip covering up a portion of a hot spot, and the image of an adjacent hot spot, not covered. The difference can be readily discerned by image processing, assuming there is sufficient contrast between the finger and the paper portion to be indicated. Thus hot spots, do not have to be spots per se, but can be other shapes, designs, colors etc., just as long as a finger on them appreciably changes the image seen by the camera in the location touched.

Figure 4C:
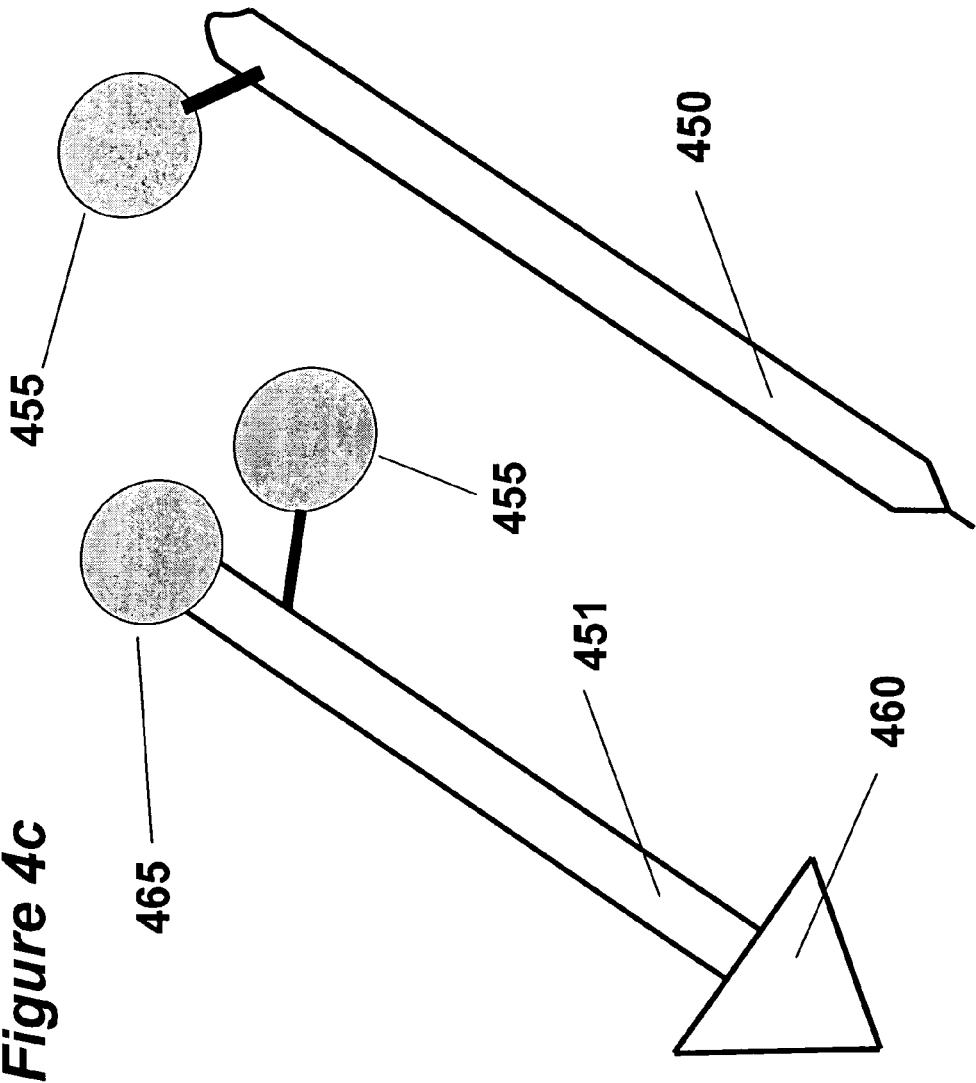
FIG. 4c illustrates use of a special pen of the invention and the sensing thereof.

FIG. 4c depicts the use of a special pen 450, having targets recognizable by the image processing software in the computer. In one example, the target 455 normally on the opposite end of the pen from the point can be placed over a hot spot to identify it. In another example, the targets 455, 460 and 465 on the pen can be used to define the pen position and orientation and photo-grammetrically calculate where the point of the pen is on the page, which point itself can identify the hot spot or action function needed as desired.

Figure 5A:
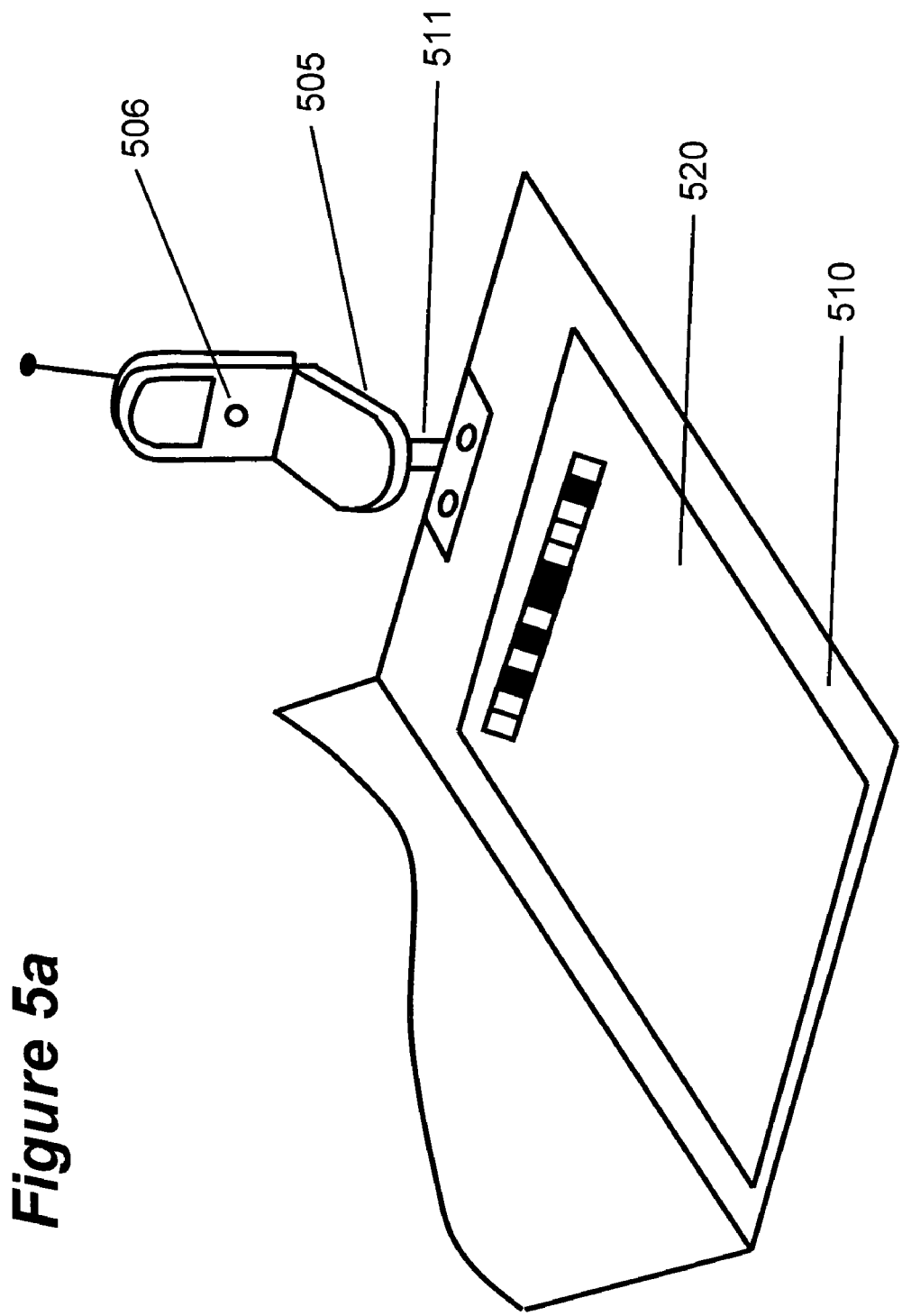
FIG. 5a illustrates a clipboard based "portable workstation" of the invention, including a feature to collapse the camera boom and slide the clipboard into a notebook for portability.

Some users may wish to take the invention with them. This is made possible today by two features. First the camera can be quite small, and indeed in a cell phone for example. This means one can use ones cell phone to acquire the images, transmit them to a remote computer and send voice and even text data back to you. In this case you work the thing with the invention, and the cell phone and remote computer do the rest. This is illustrated diagrammatically in FIG. 5a, where cell phone 505 with camera 506 is hooked to clipboard 510 and boom 511 and pointed at a page 520 on the clipboard such as those described in FIG. 3 above or others as desired.

Figure 5B:
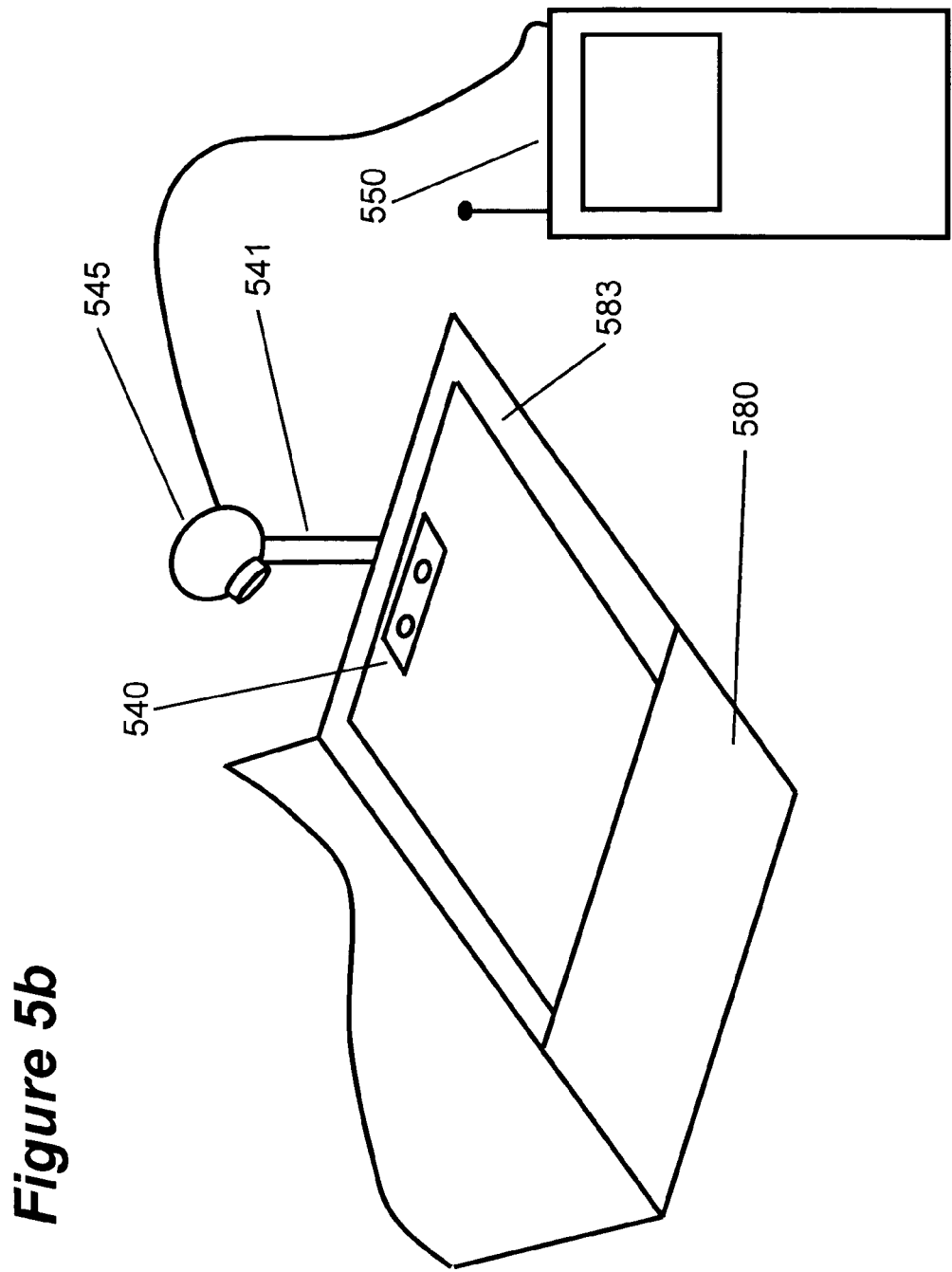
FIG. 5b illustrates further details of the portable workstation embodiment.

Alternative to a cell phone a small camera can be hooked to a PDA in which the requisite computer power is present to run the system completely locally. This is now shown. FIG. 5b illustrates a clipboard 540 of the invention having a collapsible boom 541 holding a camera 545 such as a Logitech 4000 web cam is connected to a PDA 550 such as a Dell Axim in which the software of the invention resides. The holder of page (e.g. a notebook) or the page itself can be calibrated with reference to the database. As a further way of facilitating use in the field, the clipboard slips into a pocket 580 of a notebook 583 of the invention such as shown in FIG. 2 above. This allows operation with the camera and pages in relatively fixed positions, similar to FIG. 1, but in a field portable manner.

It should be noted that this approach can be useful for military units in the field, where the low cost, low maintenance and ease of use aspects can be appreciated. FIG. 6 illustrates a video image projector 600, such as a Mitsubishi "Pocket Projector" used as an alternative to the LCD display of FIG. 1, and projecting for example, directly onto a page such as 610, or the empty back of the page 618 adjacent in a loose-leaf notebook or binder. The projector is in this example co-located in a housing 620 along with TV camera 625 and any auxiliary light source needed (realizing the LEDs of the projector can also serve to light the page if desired, by just projecting a white field). Note that an OLED type display alternatively can be provided as a "page" (such as 618) of the notebook or on the inside cover of the notebook. This "page" is driven from the computer 130 just as if it was optional LCD display 145.

FIG. 7 illustrates a doctor's aid or hospital room chart application. Charts with handwritten information as to patient's condition are commonplace in hospital rooms. While attempts have been made to computerize data such as this, the information needs to be entered and interacted with by everyone in the chain, including those who are not comfortable with full computerization, windows menus and the like. In this context the invention serves a useful purpose in allowing people to use charts they are familiar with, but with certain features which enable them to link to computer data bases, which can be helpful in distributing information in a hospital or in automatically diagnosing a condition that might otherwise have been missed, such as an oscillating temperature indicative of a bacterial infection.

For example, consider chart page 700 observed by camera 705 in the ceiling above where the chart slipped in a slot 709 on a wall 710 similar to FIG. 1b. The camera, computer and other apparatus of the invention are not shown. This chart has the date, and the vital signs so to speak manually recorded temperature, pulse, oxygen level, and blood pressure. When the nurse taking this information does so, on the line indicating the time, she colors in with a pencil (like a ballot, or multiple choice test) the appropriate variable value on the page for that day. When she leaves the camera enters the data into the hospital computer system. This is arrangement via the chart page itself, graphically shows the oscillation or trends in the values for the day. The time period can be more than a day.

The example shown has an added feature in that the "hot spots" representing the values of the vital signs variables in the 4 time periods of 6 hours (morning, afternoon, evening and night) are them selves analog functions read by the camera to the degree of resolution the camera is capable of. For this purpose cameras such as 2 mega pixel fire wire types better than normal web cams might be used, and in monochrome if needed to achieve the definition of detail required. The temperature "hot spot" in this case resembles a thermometer, with graduations from 96 to 105 Fahrenheit for example. A precision of one part in 20 is likely sufficient of this 10 degree range of possible values. As before any weird exceptions, for example under 96 can be noted directly on the chart page in pen or pencil.

It should be noted that the method of coloring on a prepared page, which is then inserted in (or otherwise presented to) a reading station, could be used for example in the home as well. For example, one can prepare a page in the comfort of ones easy chair for example, and then at ones convenience slip it into the slot, such as 155 (Shown in FIG. 1b) shown above for reading. In this case the camera and computer is set up for example to recognize as pointed out the type of page it is (E.g. emails using coloured in pages) and to look for coloured in portions representing hot spots and action functions, rather than magnets. The system can automatically be set up to distinguish the magnet from coloured in case, and in some cases there is no functional difference anyway.

Of considerable further interest is to take this one step further. If one presents a page to the camera on which a handwritten note is present (for example stuck with tape or clipped to a page of the invention placed in slot 155, this handwritten note can be digitized and transmitted as an email in JPEG or other form. For this purpose, the camera should preferably have higher resolution than one to simply see markers would require. For highest resolution results, ones handwritten notes can be digitized with a document scanner, but this is an added complication for most prospective users we feel. For doctors and other health care personnel, the handwritten notes could be transmitted in jpeg form to a central computer bank for storage, or for dissemination to others involved in a patient's treatment.

JPEGs or other video information can also be made of pictures of the person themselves, if they stand in front of the camera 160 for example. Any other thing could be placed in view of the camera for this purpose as well. It should be noted that in this case, there could be a time delay, such that a page inserted in to slot 155 is first read, and a voice generated by the computer and loudspeaker say, giving the person 15 seconds to stand in front of the camera, after which the picture is taken and a voice says "all done". The voice a few seconds before could say "say cheese" too.

At this point it is of interest to describe further what we feel is a preferred method of email transmission and communication in general for many persons. That is to send jpegs or other picture files of handwritten letters using the camera and ease of operation features of the invention. For example, consider an older person who has 4 children and 5 grandchildren. The children and grandchildren likely are computer savvy and communicate between them by email, but the older person cannot. The invention remedies this situation, by providing a simple and highly "friendly" method of communication as follows. A page of the invention is in one example dedicated to sending an email to a particular person or group. For example, a particular child, or all children, or all children and grandchildren, say. For each choice a particular page is used. So when it is desired say to send a message to John, the sender goes to a file folder and pulls out a John email page, which can be printed in big letters right at the top of the page, under the page number code linking the page automatically to a data base when read by the camera of the invention.

The person then takes this page and writes a short letter on it, with the size of letters conducive with camera resolution employed, such that a good quality letter can be transmitted. The person can then take this over to a workstation of the invention and place it in front of the camera, for example by dropping it in a slot on the fridge in FIG. 1. No other action is necessary, for when the camera reads the code as to what it is, and after a suitable time delay to allow the person to get out of the way, the camera takes an image of the letter, and the computer stores this image and transmits this as a JPEG to the person in question, in this case, John. The person can actually write the letter in a workstation of the invention itself, for example while seated in a chair such as an easy chair, or even in a car such as that of FIG. 9. In the easy chair case, the camera could be incorporated with a floor lamp commonly associated with such chairs. Additional pages of a letter can just be sent as added emails, or a special continuation sheet could be used, which would automatically be attached with the previous jpeg.

Figure 8:
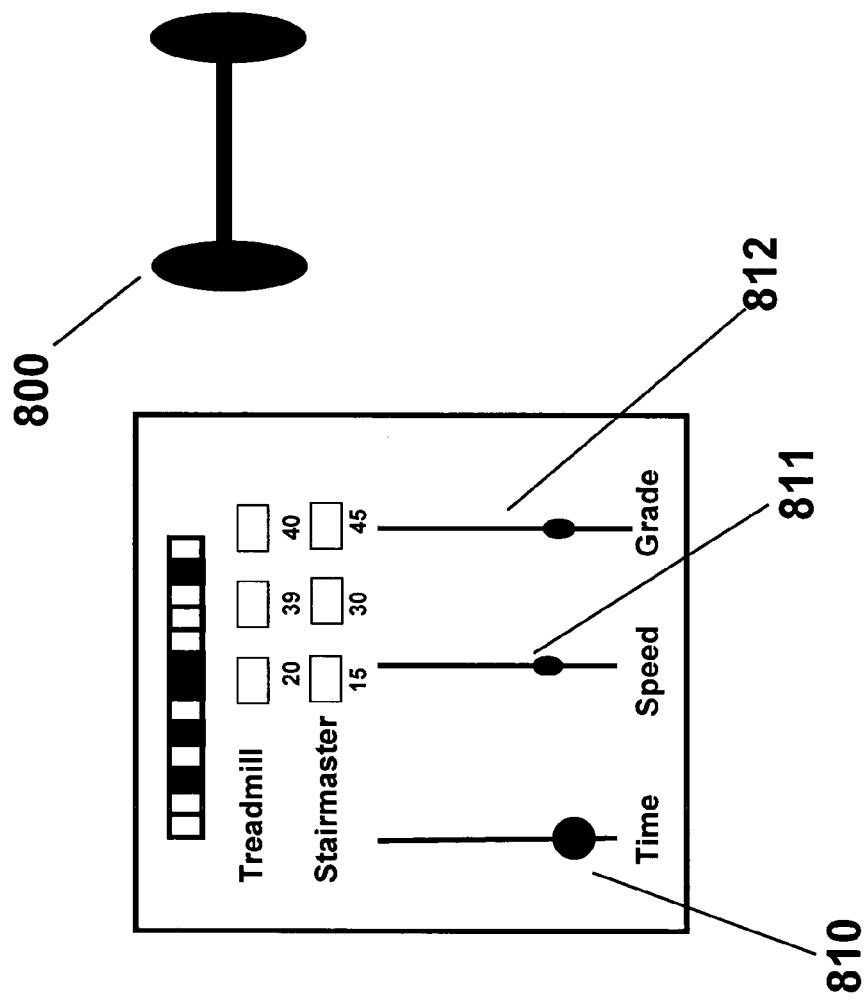
FIG. 8 illustrates a simple and portable paper or plastic device used for recording data which is later inputted to a workstation of the invention, typically via voice or camera.

FIG. 8 illustrates a simple and portable paper or plastic device used for recording data, which is later inputted to a workstation of the invention, typically via voice or camera. The user takes the device 800 with them lets say to a gym for a workout. While there, the user records by sliding the scales 810-812 to a particular time, speed and grade for a treadmill. When returning home, the user puts it under the camera of the invention, which records the time, speed and grade and associates it with the date. This could alternatively be done by coloring in hot spots on a page as described in FIG. 7 above.

Figure 9:
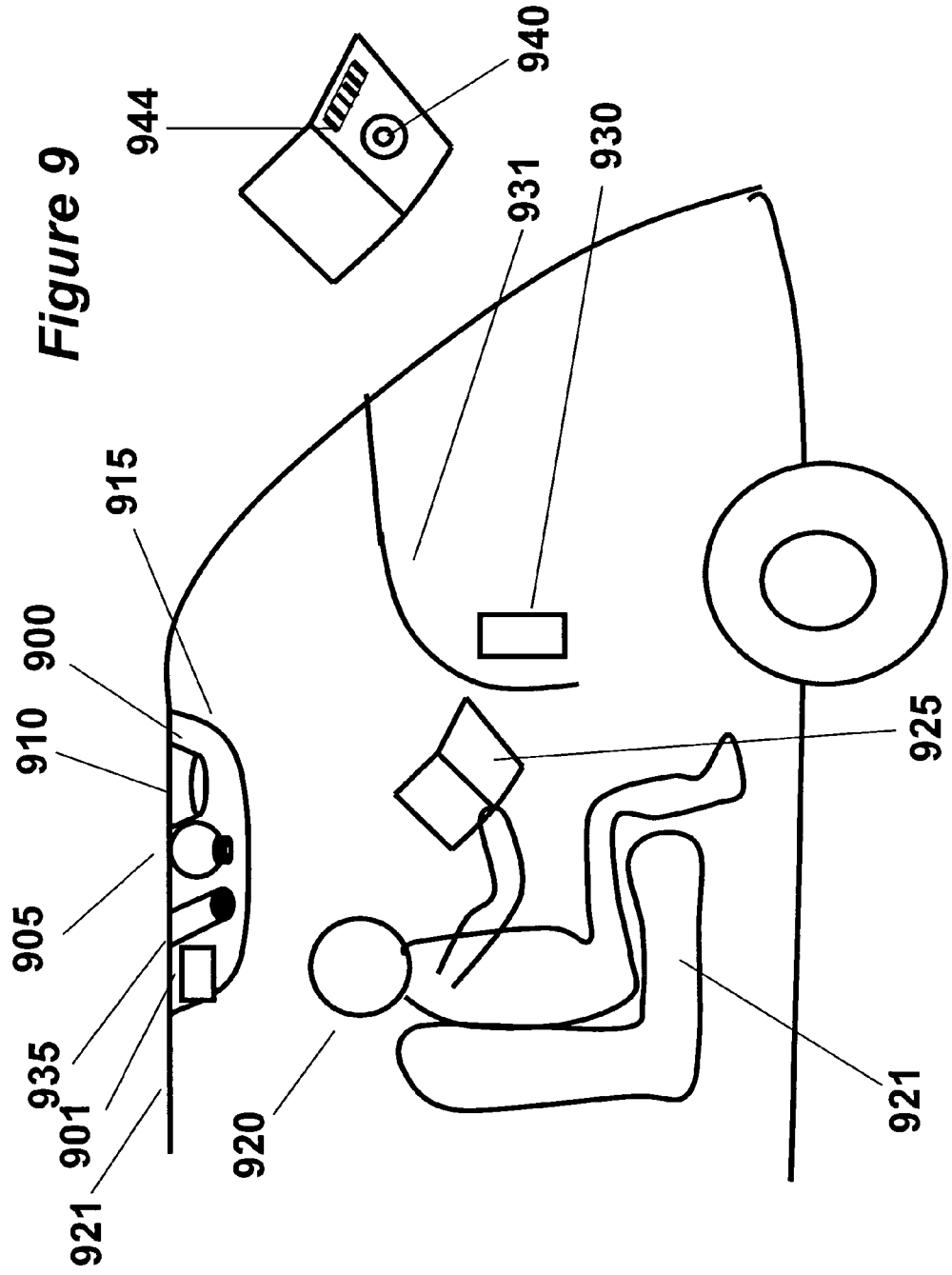
FIG. 9 illustrates a version of the invention for utilizing the owner's manual or other book in a vehicle using a vehicle mounted workstation having a camera and light source located in the headliner or overhead console of the vehicle.

FIG. 9 illustrates a version of the invention for improving and supplementing utilizing the owner's manual or other book in a vehicle using a vehicle mounted workstation 900 having a computer 901, camera 905 and light source 910 located in the headliner or in this case the overhead console 915 of the vehicle. As shown, a person 920 seated in seat 921 is reading the manual 925. The manual is equipped with hot spots as above which, when touched, are used to cue things to happen, particularly the presentation of data either audibly through the cars radio speakers, or visually on a monitor display such as an LCD 930 located on the dashboard 931. Alternatively, a separate projector can be used, such as 935 to project information right onto a piece of paper or other part of the manual on the users lap, or a portion of the vehicle in front of them for example.

Information to be provided can be used to supplement the manual, and indeed reduce its cost of printing. For example, for changing a tire, one simply points at the picture of a tire 940, which is known relative to the page number code 944 in the database of the computer not shown. The computer then generates full instructions including audio and video to show one how to change the tire.

Now illustrated are some alternative locations for camera-based workstations of the invention in the home, and particularly in the kitchen. The locations depicted generally are out of the way in terms of locating hardware, and are not difficult to get normal power to. It is also envisioned that if required, units could be battery powered, with wireless transmission to a remote computer. And that wireless transmission of information back to the reading site, such as audio or visual information, could be used as well.

Figure 10A:
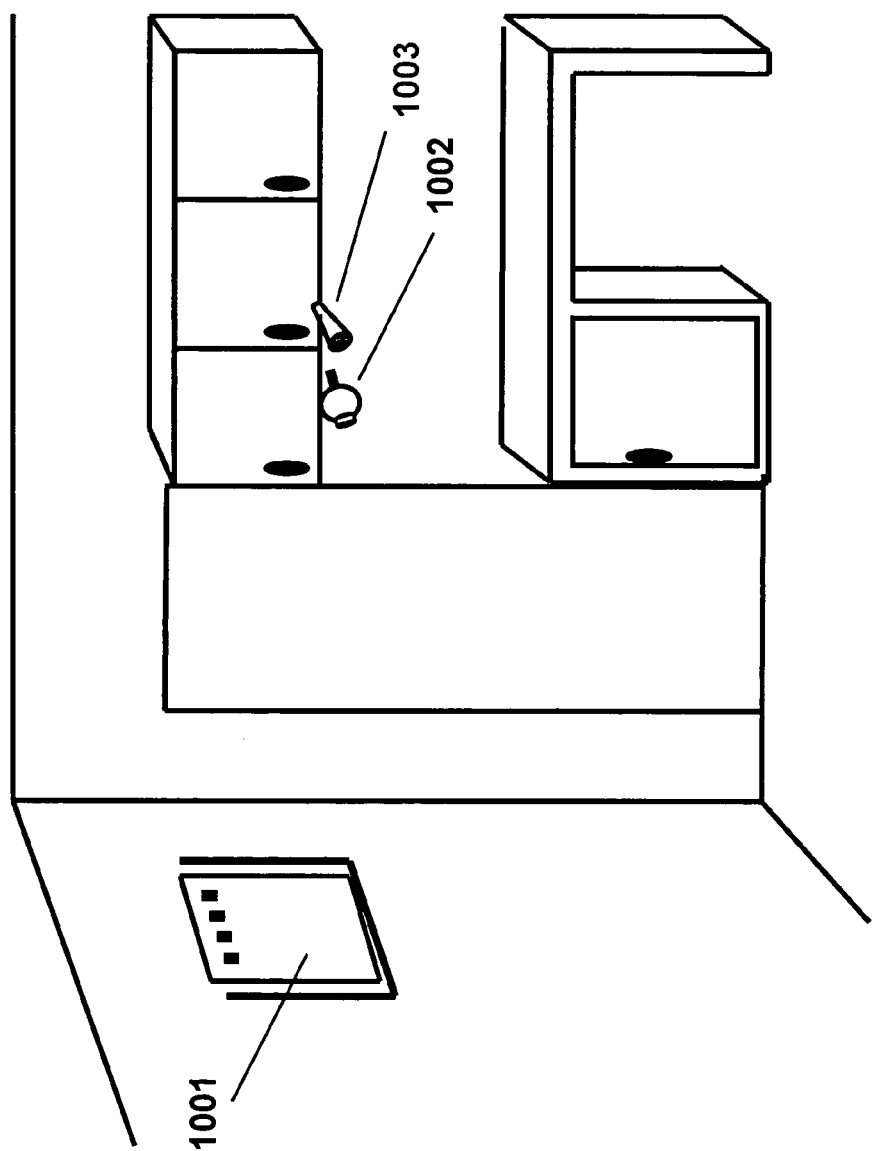
FIG. 10a, illustrates the camera and optional small projector of the invention located underneath a kitchen cabinet.
Figure 10B:
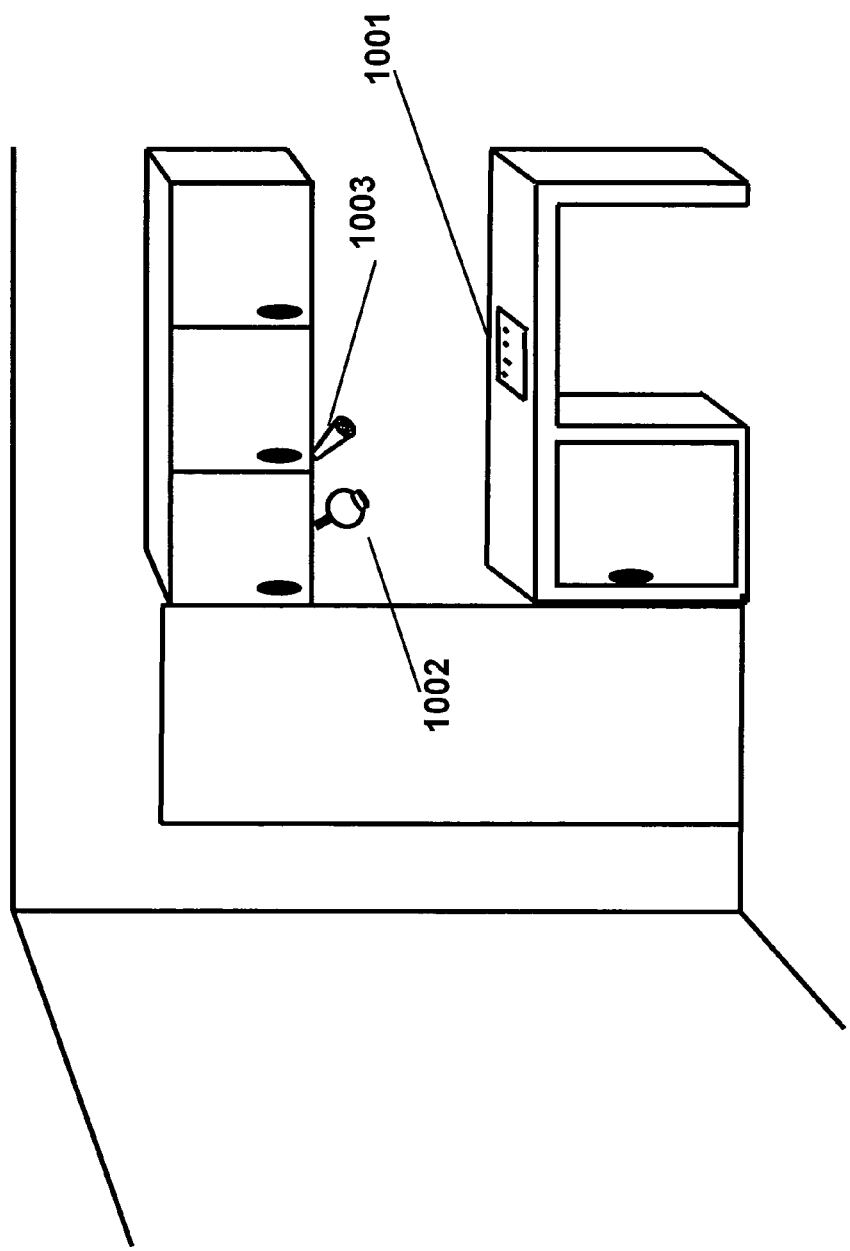
FIG. 10b illustrates the same location but with the camera and projector looking down at a notebook placed on a countertop beneath the cabinet.
Figure 10C:
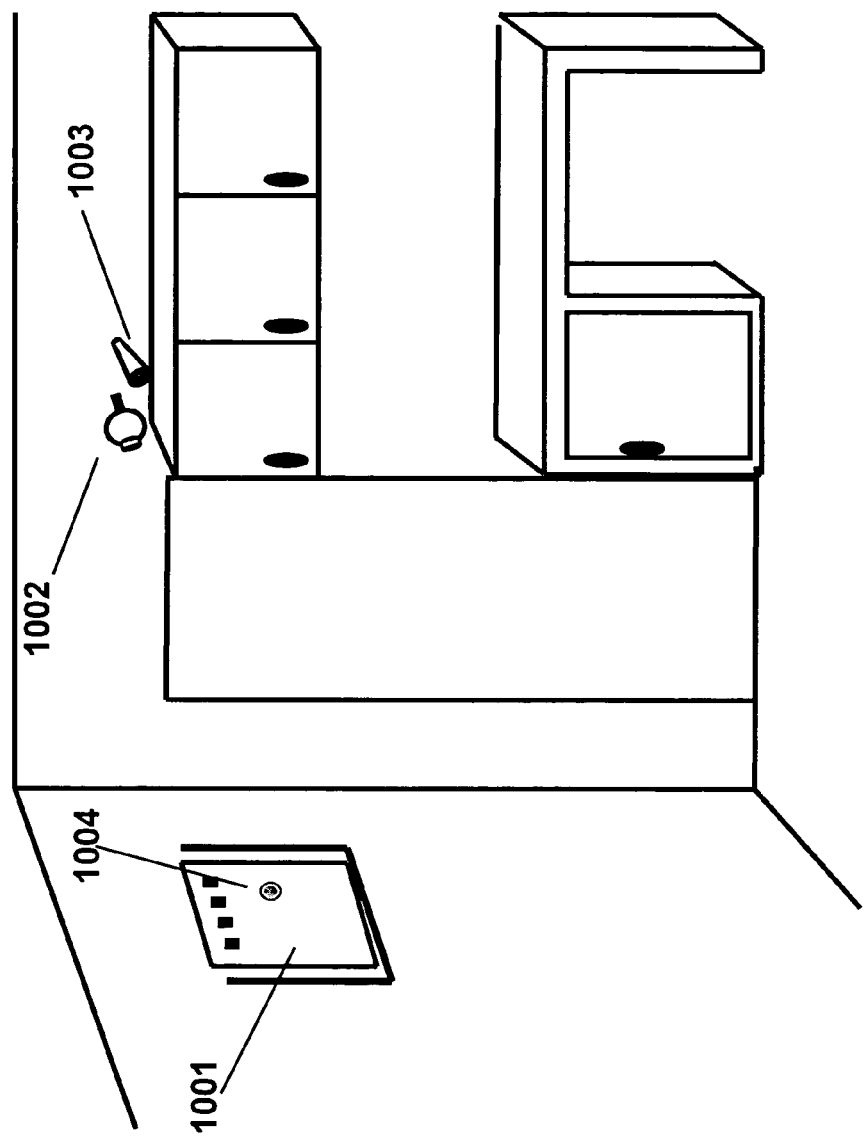
FIG. 10c illustrates a similar situation in which the camera and optional projector are located on top of a cabinet, looking across at a wall mounted reading location.

FIG. 10a, illustrates the camera 1002 and optional small projector 1003 of the invention located underneath a kitchen cabinet, and looking across an aisle or other space at a reading location on a nearby wall, on which a single page 1001 is inserted or a multi-page book placed. FIG. 10b illustrates the same location but with the camera 1002 and projector 1003 looking down at a notebook 1001 placed on a countertop beneath the cabinet. FIG. 10c illustrates a similar situation in which the camera 1002 and optional projector 1003 are located on top of a cabinet, looking across at a wall mounted reading location 1001. Such a location can also have a steel sheet backing on which magnet markers 1004 can be used if desired.

It is noted that the invention provides a workstation for the input of commands and data at low cost. This has significant savings when a large number of such terminals are contemplated, used by a variety of personnel not all of whom are able to be trained on sophisticated computer terminal devices. The most economic arrangement is when the time the terminal is used is relatively little and input is slow, such that little computer sophistication is needed, and little or no feedback, other than simple voice for example is needed to the user. One can share a number of video cameras from terminals for example on a firewire daisy chain type arrangement, with each camera interrogated in turn by the computer.

The invention is able to create a computer interface on anything. Any physical space, of any scale, horizontal, vertical, pre-designed or spontaneously constructed—can be used to manipulate data. Users can experience the same DOS to GUI revolution all over again, but this time removing the limitations of the virtual desktop. While computers are the essential tool needed to cut costs for seniors, there is a huge user resistance to their use by many Seniors. We believe that if we can make an easy to use interface to a computer that has a familiar book-like appearance, we can get a majority of seniors to become involved in managing their own health care and in the process producing better and less expensive medical care.

While the application herein has primarily been oriented toward Senior Citizens and the disabled, many features may appeal even to seasoned computer users. The invention may for example, be used as an adjunct to a computer to allow a person to easily utilize help and instructional information in a linked book form related to a particular program they are using on the computer itself, such as Word, Excel or AutoCAD. This can be of considerable importance when one is using a program, which is somewhat unfamiliar in certain aspects or in its entirety.

FIG. 11 illustrates an alternative input arrangement to FIG. 1 above or other embodiments herein, in which a page 1100 of the invention is placed on a separate member also sensed by a TV camera 120, such as "Action Board" 1110. Within the limits of the computer vision software of the invention to adjust to different positions of the page, the placement of the page on the board can be arbitrary in angulation or x-y location, as long as it is bounded on each side by lines 1115 and 1116 and within the field of view of a camera of the invention (not shown for clarity). And in this example, the action board 1110 instead of (or in addition to) the page as previously disclosed may contain action symbols for touching, such as "GO" button mark 1120 on the right of line 1116 and other buttons such as 1130-1133 to the left of line 1115.

In one mode of operation, a touch location such as circle 1104 on page 1100 is touched with ones left forefinger, to indicate a desired answer to a question printed in text 1105 on the page 1100. To enter the data, the person touches the GO button 1120 on the Action Board. The machine vision program detects the presence of the fingers on both the circle 1104 and button 1120 and transmits this data to the computer program making use of this input information. Typically a "beep" or other signal is provided to the user that his input has been accepted. If for some reason a clear answer has not been ascertained within a time window, a voice may be activated to tell the user to try again. Or with sufficient sophistication, the program may be able to tell what is wrong, and instruct with a voice command for example, to move one finger or other.

One advantage of having a separate action board as just described is that different users can bring their pages to the system employing the TV camera, computer and action board. In this case is desired to know what user is using the system. This can be done by keying in the users name, or more advantageously using one of the many automatic biometric identification systems in use today for fingerprints, iris prints or whatever. The code for what user, or what page even for the same user can alternatively be carried on the page itself, as previously described. Or it could be on a third object, place on the page or action board just to provide the identification. This object can, for example, be a sticker for example with the persons name on it, such as "MARY", the signature of which can be identified by the computer vision program.

Figure 12:
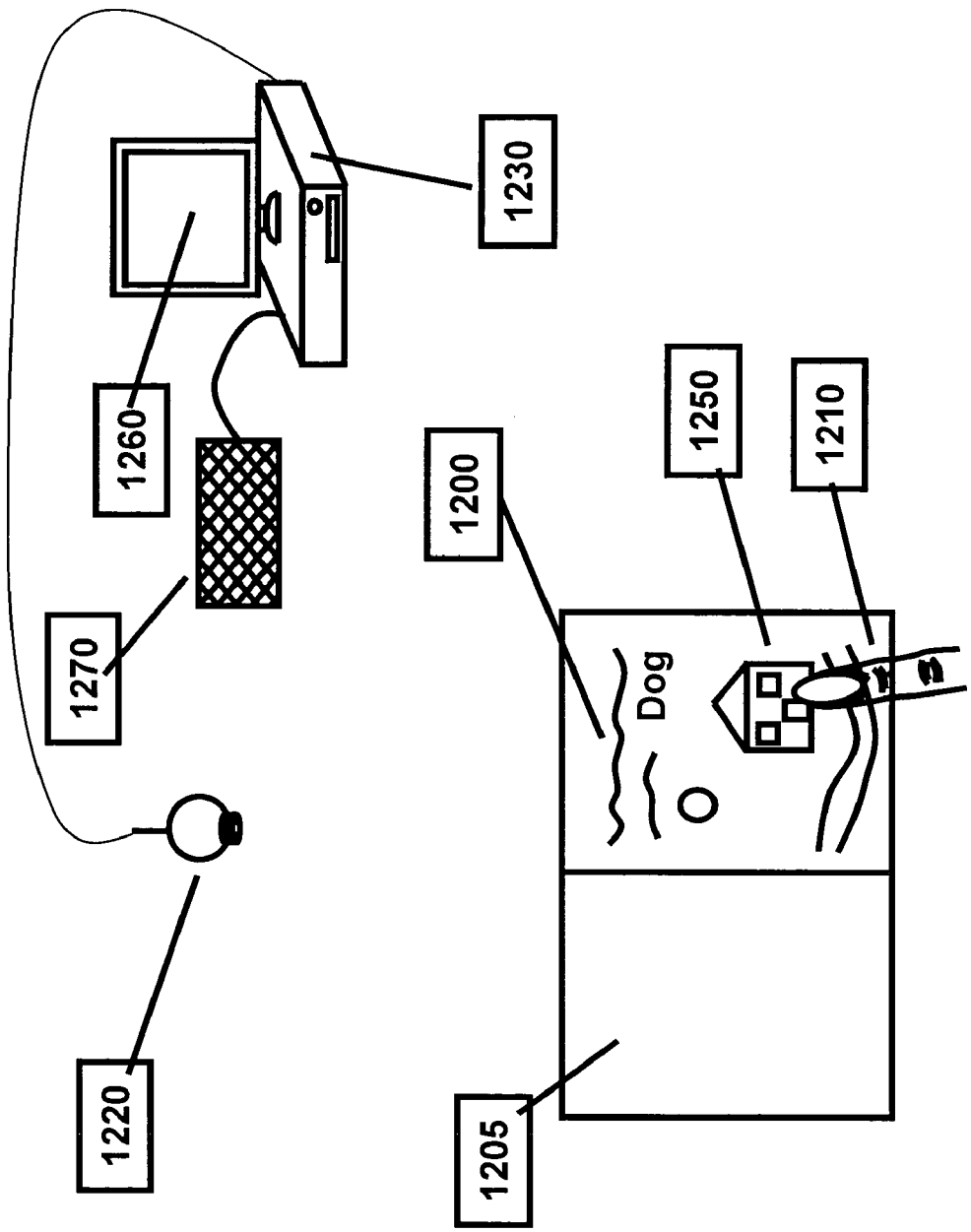

FIG. 12 illustrates an alternative method to codes and other methods described above for determining the page that the camera is looking at. In this example, it is desired to identify the page 1200 of a child's reader 1205 that a reader of the book, having finger 1210, has turned to. In this case camera 1220 as previously taught acquires the image of the page and transfers the image to computer 1230, where the information on the page is compared to a series of templates containing for example relevant information from all the pages of the book in question. This comparison can be aided by using Cognex Corporation PATMAX software or other pattern comparison software which is in many cases able to accommodate a great deal of angular and positional variation in page images. Once the best match is found, this information is used in further actions such as identifying the picture such as 1250 on the page that the user is touching with finger 1210.

While one can alternatively attempt to read the page number on the page and identify it using character recognition software, this in many cases may require specialized type fonts on the page or requires the use of high-resolution cameras. The aforementioned pattern matching technique is thus very useful as it allows books already in print to be used with the invention, without special cameras, and/or reprinting with special fonts. In many cases the book in question is simple (such as a Dick and Jane reader, for example having large print and miscellaneous pictures on each page in different locations) and doesn't require much sophistication in identification of a particular page. Indeed, where the situation is simple enough, one cannot only identify the page, but also the book itself, from at least a limited selection of books. One example would be 5 books used during the course of a year, by a first or second grade class. This aspect of the invention allows one to provide previously printed texts with additional computer generated display 1260 and computer generated voice information from loudspeaker 1270 which can provide to the user other information related to the book experience, and can easily switch the language if desired to even aid understanding. For example an English reader can be used to teach Italian children to read English, by verbalizing automatically from the computer a word they touch with their finger. Touching the word Dog as shown in FIG. 12, both can allow the computer to say the word (using text to speech programs) "Dog", but also the Italian equivalent "Cane".

In the above example, we have used Italian as an example, but in the USA perhaps more general would be Spanish, and in Quebec, French, and so on. And for Chinese kids, you could not only have the computer say it in Chinese, but provide on a display screen the Chinese character equivalent. Actually for any language it might be good to display the alternative spelling or other representation in their native language.

Figure 13A:
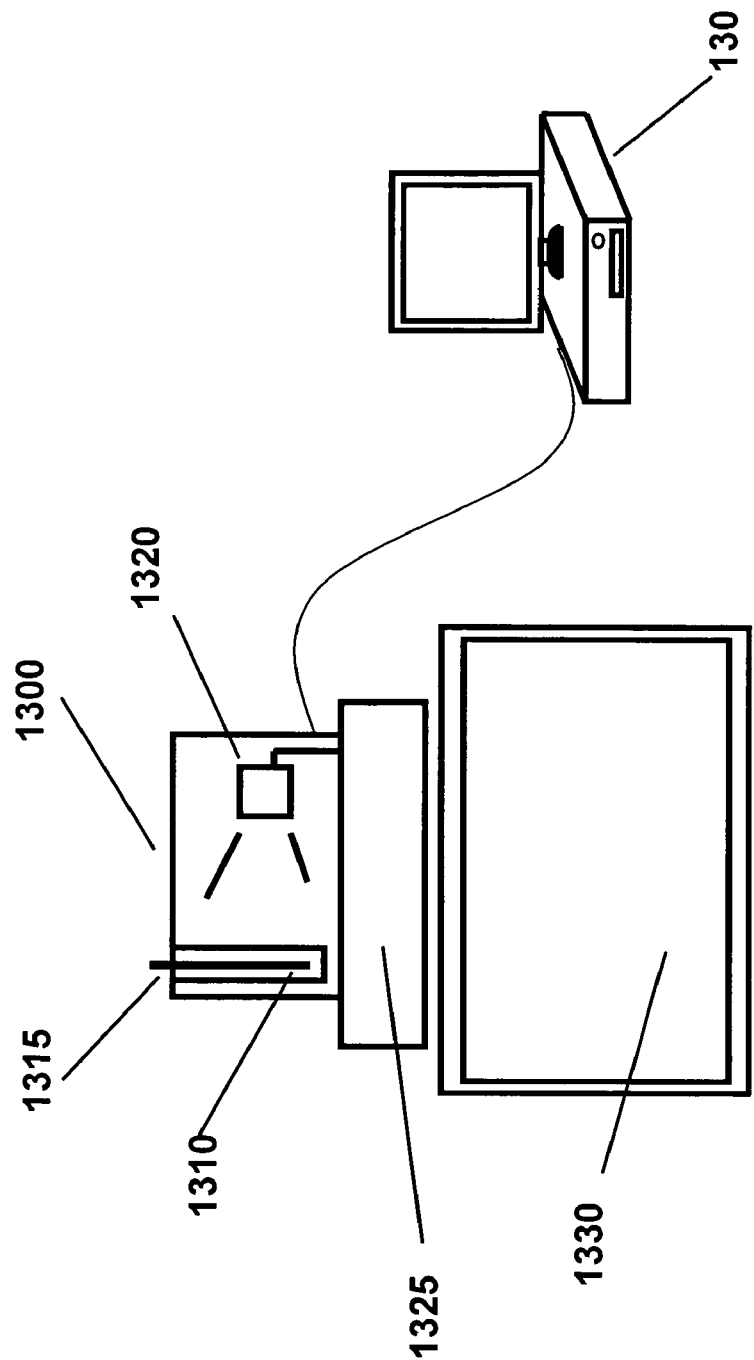
FIG. 13a illustrates a device accepting the input of a page in order to control a television or provide other functions and using the television to display information from internet or other sources.

FIG. 13*a* illustrates a device accepting the input of a page in order to control a television or provide other functions and using the television to display information from Internet or other sources. As shown the device 1300 has a slot 1310 in which a page 1315 of the invention is placed, similar to that of the refrigerator above. A camera 1320 observes the page and transmits page information to a computer 1325. In this example the computer has the further function of controlling the Television set 1330, on which the device sits, in the manner of a "set top box" used for cable connection or digital recording or both. In this example however, the input commands to this form or set top box is given by a page of the invention rather than a classical remote control device which is hard to use, and easy to lose or damage.

Figure 13B:
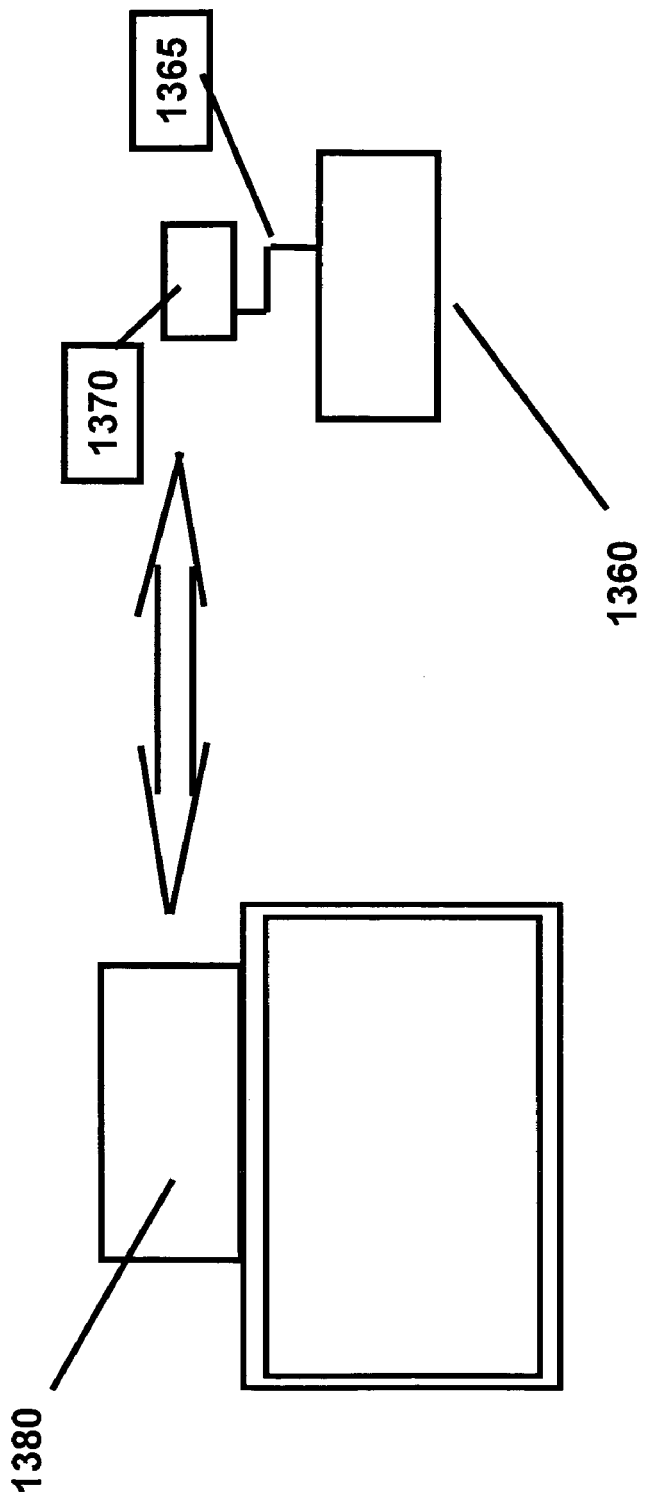

FIG. 13*b* illustrates a remote version 1360 of the device of FIG. 13*a* in which camera image data 1365 from is communicated for processing by wireless or other means 1370 to for example a set top box device 1380 containing a main computer for digital recording and cable or satellite input. This remote device need have no onboard sophistication other than means to transmit TV images. Thus it can be small and built in to furniture if desired, or carried from room to room. In both cases of FIG. 13, the TV also can act as a display means for other information which might be gathered by the computer of the device such as internet searches, music play lists from stereo systems, scrapbook information or the like.

While the invention has been described in connection with numerous embodiments, it is to be understood that the specific mechanisms and techniques, which have been described, are merely illustrative of the principles of the invention, numerous modifications may be made to the methods and apparatus described without departing from the spirit and scope of the invention.

What is claimed:

1. A method for producing a computer output which is associated with a user action comprising the steps of:
   providing a page with identifying and control indicia thereon;
      initially creating a data base in a memory of a computer, said creating step including the steps of
         imaging the page with a camera and associating the identifying information on the page with the imaged page,
         identifying a selected portion of the imaged page including control indicia which is to be associated with a specified computer output,
         storing the identifying information of the page and the identified selected portion of the page in the memory of the computer, and
         determining a specified computer output to be associated with a user locating an object at the selected portion of the page;

subsequently placing of the page by the user in a position to be imaged by a camera, and locating of an object at the selected portion of the page by the user;

analyzing the image of the placed page with the computer to associate the page placed by the user with the identifying information of the page in the data base, further analyzing the image of the placed page with the computer to determine if an object was located at the selected portion of the placed page by the user;

outputting of the computer output associated with the selected portion of the page if the object was located at the selected portion of the placed page by the user.

2. A method according to claim 1 wherein said page is a sheet of paper.

3. A method according to claim 1 wherein said page is part of a book or other related collection of sheets.

4. A method according to claim 1 wherein said object is a marker placed on the page by a user.

5. A method according to claim 1 wherein said object is a finger of a user.

6. A method according to claim 1 wherein color of information on said page or said object is used in said analysis.

7. A method according to claim 1 including the further step of correcting alignment of said image as part of said analysis steps.

8. A method according to claim 1 including the further step of sensing another finger location on said page or on a further member.

9. A method according to claim 1 including the further step of identifying the user and storing information relating to pages of said user.

10. A method according to claim 1 wherein said camera is located at an acute angle to said page in a position away from said user.

11. A method according to claim 1 wherein said page is identified by comparison with patterns of pages in a data base.

12. A method according to claim 1 wherein said page is identified by comparison with a color based code on the page.

* * * * *